United States Patent
Hayashi et al.

(10) Patent No.: US 6,638,618 B2
(45) Date of Patent: Oct. 28, 2003

(54) BLACK COMPOSITE IRON OXIDE PIGMENT, AND PAINT AND RESIN COMPOSITION USING THE SAME

(75) Inventors: Kazuyuki Hayashi, Hiroshima (JP); Yusuke Shimohata, Hiroshima (JP); Mineko Ohsugi, Hiroshima (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/012,248

(22) Filed: Dec. 11, 2001

(65) Prior Publication Data

US 2002/0117084 A1 Aug. 29, 2002

(30) Foreign Application Priority Data

Dec. 19, 2000 (JP) ........................................ 2000-386100

(51) Int. Cl.⁷ ................................................. B32B 9/00
(52) U.S. Cl. ...................................................... 428/402
(58) Field of Search .................................. 428/407, 405

(56) References Cited

U.S. PATENT DOCUMENTS 5,686,012 A * 11/1997 Hayashi et al. ........... 252/62.56
6,379,855 B1 * 4/2002 Hayashi et al. .......... 430/106.1
6,416,864 B1 * 7/2002 Hayashi et al. ............. 428/403
6,420,030 B1 * 7/2002 Hayashi et al. ............. 428/407
6,440,561 B2 * 8/2002 Hayashi et al. ............. 428/407

* cited by examiner

*Primary Examiner*—H. Thi Le
(74) *Attorney, Agent, or Firm*—Nixon & Vanderhye P.C.

(57) ABSTRACT

A black composite iron oxide pigment of the present invention comprises composite iron oxide particles having an average particle size of 0.08 to 1.0 $\mu$m, comprising:

as core particles iron oxide particles, a coating formed on surface of said iron oxide particle, comprising at least one organosilicon compound selected from the group consisting of:
(1) organosilane compounds obtainable from alkoxysilane compounds, and
(2) polysiloxanes or modified polysiloxanes, and an organic blue-based pigment coat formed on said coating comprising said organosilicon compound, in an amount of from 1 to 50 parts by weight based on 100 parts by weight of said iron oxide particles. The black composite iron oxide pigment is capable of exhibiting not only a deep black color, but also excellent acid resistance and light resistance, a paint containing the black composite iron oxide pigment, and a resin composition containing the black composite iron oxide pigment

12 Claims, No Drawings

BLACK COMPOSITE IRON OXIDE PIGMENT, AND PAINT AND RESIN COMPOSITION USING THE SAME

BACKGROUND OF THE INVENTION

The present invention relates to a black composite iron oxide pigment, and a paint and a resin composition using the black composite iron oxide pigment, and more particularly, to a black composite iron oxide pigment capable of exhibiting not only a deep black color, but also excellent acid resistance and light resistance, a paint containing the black composite iron oxide pigment, and a resin composition containing the black composite iron oxide pigment.

Carbon black fine particles and magnetite particles are known as typical black pigments, and have been generally used longtime as colorants for paints, printing inks, cosmetics, rubbers, resin compositions or the like.

Among these conventional black pigments, the carbon black fine particles show a most excellent blackness, and coating films or resin compositions using the carbon black fine particles are also excellent in acid resistance. However, since the carbon black fine particles are particles having an average particle size as small as about 0.005 to 0.05 $\mu$m, it is difficult to uniformly disperse the carbon black fine particles in vehicles or resin compositions. In addition, the carbon black fine particles are bulky fine particles having a bulk density of about 0.1 g/cm$^3$ and, therefore, are difficult to handle, resulting in deteriorated workability. Further, the carbon black fine particles have hygiene and safety problems such as carcinogenesis.

Specifically, when the carbon black fine particles are used in a larger amount, a higher blackness can be attained. On the other hand, it is more difficult to uniformly disperse such a large amount of the carbon black fine particles in vehicles or resin compositions, resulting in poor workability. Also, the use of a larger amount of the carbon black fine particles is disadvantageous from the viewpoints of hygiene or safety.

The magnetite particles have an appropriate particle size, specifically an average particle size of about 0.08 to 1.0 $\mu$m and, therefore, show an excellent dispersibility in vehicles or resin compositions as well as a good handling property. In addition, the magnetite particles are harmless particles. However, the magnetite particles are insufficient in blackness, and coating films or resin compositions using the magnetite particles are also insufficient in acid resistance.

Further, the magnetite particles tend to be magnetically agglomerated together because of inherent magnetism thereof. For this reason, the use of manganese-containing hematite particles as black iron oxide particles having no magnetism have been proposed from the standpoints of improved dispersibility in vehicles or resin compositions. However, the manganese-containing hematite particles are deteriorated in blackness as compared to that of the magnetite particles.

Thus, it has been strongly required to provide black particles capable of not only showing a good blackness similar to or compatible with that of the carbon black fine particles, an excellent dispersibility in vehicles or resin compositions and a good handling property, but also producing a coating film or a resin composition having excellent acid resistance, light resistance and heat resistance.

Also, in recent years, it has been strongly required to provide black particles exhibiting in addition to the above properties, a less reddish and deep black color.

In order to meet these requirements, various methods have been conventionally attempted for producing composite particles from the carbon black fine particles and magnetite particles, thereby obtaining black particles exhibiting excellent combined properties thereof. For example, there are known 1) the method of adding a water dispersion containing carbon black fine particles to a water suspension containing magnetite particles precipitated from an aqueous solution thereof, and then mixing and stirring the mixed dispersion to absorb the carbon black fine particles onto the surface of the magnetite particles (Japanese Patent Publication (KOKOKU) No. 50-13300(1975)); 2) the method of introducing iron-containing sludge in which high-molecular organic materials such as molasses are dissolved, and a carbon black-containing hot gas into a spray reactor at a temperature of 450 to 850° C. in order to produce magnetite particles from the iron salt and simultaneously bond carbon black on the surface of the magnetite particles using the molasses as a binding accelerator (Japanese Patent Application Laid-Open (KOAKI) No. 49-48725(1974)); 3) the method of suspending carbon black in an aqueous iron salt solution, and co-precipitating the carbon black and magnetite by adding alkali to the suspension, thereby producing co-precipitated particles coated with carbon black (Japanese Patent Publication (KOKOKU) No. 55-39580(1980)); 4) the method of adhering carbon black, etc., onto the surface of fine plate-shaped particles, and fixing the carbon black, etc., on the surface of the particles using an anionic, cationic or nonionic surfactant and an organofunctional organosilane compound (Japanese Patent Application Laid-Open (KOAKI) Nos. 6-145556(1994) and 7-316458(1995)); or the like.

At present, it has been strongly demanded to provide black particles capable of not only showing a blackness similar to or compatible with that of carbon black fine particles, a less reddish and deep black color and excellent dispersibility in vehicles or resin compositions, but also providing a coating film or a resin composition having excellent acid resistance, light resistance and heat resistance. However, such black particles capable of fulfilling these requirements have not been obtained conventionally.

That is, in the above conventional method 1) described in Japanese Patent Publication (KOKOKU) No. 50-13300 (1975), since the carbon black fine particles tend to be desorbed from the surface of the magnetite particles when dispersed in vehicles or resin compositions because of high desorption percentage thereof, it is difficult to uniformly disperse the carbon black fine particles in vehicles or resin compositions. In addition, the obtained paints or resin compositions are not sufficiently improved in blackness.

In the above conventional method 2) described in Japanese Patent Application Laid-Open (KOKAI) No. 49-48725 (1974), in order to obtain a high blackness similar to or compatible with that obtained by using carbon black fine particles only, it is necessary to use the carbon black fine particles in as large an amount as about 280 parts by weight based on 100 parts by weight of the magnetite particles.

In the above conventional method 3) described in Japanese Patent Publication (KOKOKU) No. 55-39580(1980), in order to obtain a high blackness similar to or compatible with that of obtained by using carbon black fine particles only, it is also necessary to add the carbon black fine particles in as large an amount as about 100 to 400 parts by weight based on 100 parts by weight of the magnetite particles. In addition, the carbon black fine particles adhered onto the surface of the co-precipitated particles tend to be desorbed therefrom.

In the above conventional method 4) described in Japanese Patent Application Laid-Open (KOKAI) Nos. 6-145556(1994) and 7-316458(1995), the carbon black fine particles tend to be desorbed from the obtained particles. In addition, the particles obtained by this method are not black particles.

Further, in Japanese Patent Application Laid-Open (KOKAI) No. 11-323174(1999), there are described black composite iron-based particles, comprising black iron oxide particles or black iron oxide hydroxide particles, a coating layer formed on the surface of the black iron oxide or iron oxide hydroxide particles comprising organosilane compounds obtainable from alkoxysilanes, and a carbon black coat adhered on the surface of the coating layer. However, as shown in Comparative Examples below, the obtained particles fail to show a deep black color.

As a result of the present inventors' earnest studies, it has been found that by forming a coating layer comprising at least one organosilicon compound selected from the group consisting of organosilane compounds obtainable from alkoxysilane compounds, and polysiloxanes, on the surface of iron oxide particles, and then adhering an organic blue-based pigment coat on the coating layer, the obtained black composite iron oxide pigment not only can exhibit a blackness similar to or compatible with that of carbon black fine particles, a less reddish and deep black color, excellent dispersibility in vehicles or resin compositions and a good handling property, but also can provide a coating film or a resin composition having excellent acid resistance, light resistance and heat resistance. The present invention has been attained on the basis of the finding.

SUMMARY OF THE INVENTION

An object of the present invention is to provide a black composite iron oxide pigment capable of exhibiting a deep black color, and excellent acid resistance and light resistance.

An another object of the present invention is to provide a paint or resin composition containing black composite iron oxide pigment, exhibiting a deep black color, and excellent acid resistance and light resistance.

To accomplish the aims, in a first aspect of the present invention, there is provided a black composite iron oxide pigment comprising composite iron oxide particles having an average particle size of 0.08 to 1.0 μm, comprising:

as core particles iron oxide particles,
a coating formed on surface of said iron oxide particle, comprising at least one organosilicon compound selected from the group consisting of:
  (1) organosilane compounds obtainable from alkoxysilane compounds, and
  (2) polysiloxanes or modified polysiloxanes, and
an organic blue-based pigment coat formed on said coating comprising said organosilicon compound, in an amount of from 1 to 50 parts by weight based on 100 parts by weight of said iron oxide particles.

In a second aspect of the present invention, there is provided a black composite iron oxide pigment comprising composite iron oxide particles having an average particle size of 0.08 to 1.0 μm, comprising:

as core particles iron oxide particles, wherein a coating layer composed of at least one compound selected from the group consisting of hydroxides of aluminum, oxides of aluminum, hydroxides of silicon and oxides of silicon is disposed between the surface of said iron oxide particles and coating layer comprising said organosilicon compound,
a coating formed on surface of said iron oxide particle, comprising at least one organosilicon compound selected from the group consisting of:
  (1) organosilane compounds obtainable from alkoxysilane compounds, and
  (2) polysiloxanes or modified polysiloxanes, and
an organic blue-based pigment coat formed on said coating comprising said organosilicon compound, in an amount of from 1 to 50 parts by weight based on 100 parts by weight of said iron oxide particles.

In a third aspect of the present invention, there is provided a black composite iron oxide pigment comprising composite iron oxide particles having an average particle size of 0.08 to 1.0 μm, comprising:

as core particles iron oxide particles comprising: iron oxide particles,
a coating formed on the surface of said iron oxide particle, comprising at least one organosilicon compound selected from the group consisting of:
  (1) organosilane compounds obtainable from alkoxysilane compounds, and
  (2) polysiloxanes or modified polysiloxanes, and
a carbon black coat formed on at least a part of the surface of said coating layer comprising said organosilicon compound, in an amount of 1 to 30 parts by weight based on 100 parts by weight of the said iron oxide particles,
a coating formed on surface of said iron oxide particle, comprising at least one organosilicon compound selected from the group consisting of:
  (1) organosilane compounds obtainable from alkoxysilane compounds, and
  (2) polysiloxanes or modified polysiloxanes, and
an organic blue-based pigment coat formed on said coating comprising said organosilicon compound, in an amount of from 1 to 50 parts by weight based on 100 parts by weight of said iron oxide particles.

In a fourth aspect of the present invention, there is provided a black composite iron oxide pigment comprising composite iron oxide particles having an average particle size of 0.08 to 1.0 μm, comprising:

as core particles iron oxide particles comprising:
iron oxide particles, wherein a coating layer composed of at least one compound selected from the group consisting of hydroxides of aluminum, oxides of aluminum, hydroxides of silicon and oxides of silicon is disposed between the surface of said iron oxide particles and coating layer comprising said organosilicon compound,
a coating formed on the surface of said iron oxide particle, comprising at least one organosilicon compound selected from the group consisting of:
  (1) organosilane compounds obtainable from alkoxysilane compounds, and
  (2) polysiloxanes or modified polysiloxanes, and
a carbon black coat formed on at least a part of the surface of said coating layer comprising said organosilicon compound, in an amount of 1 to 30 parts by weight based on 100 parts by weight of the said iron oxide particles,
a coating formed on surface of said iron oxide particle, comprising at least one organosilicon compound selected from the group consisting of:

(1) organosilane compounds obtainable from alkoxysilane compounds, and (2) polysiloxanes or modified polysiloxanes, and an organic blue-based pigment coat formed on said coating comprising said organosilicon compound, in an amount of from 1 to 50 parts by weight based on 100 parts by weight of said iron oxide particles.

In a fifth aspect of the present invention, there is provided a paint comprising a paint base material and a black composite iron oxide pigment as defined in any one of the 1st to 4th aspects.

In a sixth aspect of the present invention, there is provided a resin composition tinted with the black composite iron oxide pigment as defined in any one of the 1st to 4th aspects.

In a seventh aspect of the present invention, there is provided a black composite iron oxide pigment comprising composite iron oxide particles having an average particle size of 0.08 to 1.0 μm, a geometrical standard deviation value of the average particle size of not more than 2.0, comprising:

as core particles iron oxide particles, a coating formed on surface of said iron oxide particle, comprising at least one organosilicon compound selected from the group consisting of:

(1) organosilane compounds obtainable from alkoxysilane compounds, and (2) polysiloxanes or modified polysiloxanes, and an organic blue-based pigment coat formed on said coating comprising said organosilicon compound, in an amount of from 1 to 50 parts by weight based on 100 parts by weight of said iron oxide particles.

DETAILED DESCRIPTION OF THE INVENTION

The present invention will now be described in detail below.

First, the black composite iron oxide pigment according to the present invention is described.

The black composite iron oxide pigment according to the present invention, is composed of black composite iron oxide particles, comprising iron oxide particles as core particles, a coating layer formed on the surface of the iron oxide particles comprising at least one organosilicon compound selected from the group consisting of organosilane compounds obtainable from alkoxysilane compounds, and polysiloxanes, and an organic blue-based pigment coat formed onto the coating layer.

As the core particles used in the present invention, there may be exemplified (A) iron oxide particles such as magnetite particles, zinc-containing magnetite particles, hematite particles and manganese-containing hematite particles which contain manganese in an amount of 5 to 40% by weight based on the total weight of the manganese-containing hematite particles; and (B) composite iron oxide particles comprising the above iron oxide particles as core particles, a coating layer formed on the surface of the iron oxide particles, which comprises at least one organosilicon compound selected from the group consisting of organosilane compounds obtainable from alkoxysilane compounds, or polysiloxanes, and a carbon black coat formed on the coating layer (hereinafter referred to merely "composite iron oxide particles precursor").

In the consideration of blackness of the obtained black composite iron oxide pigment, the composite iron oxide particles precursor (B) comprising the iron oxide particles, a coating layer formed on the surface of iron oxide particles which comprises at least one organosilicon compound selected from the group consisting of organosilane compounds obtainable from alkoxysilane compounds, or polysiloxanes, and a carbon black coat formed on the coating layer, is preferred.

The iron oxide particles as core particles are first explained.

The iron oxide particles may be of any suitable shape, and may include, for example, granular particles such as spherical particles, granularated particles, octahedral particles, hexahedral particles, polyhedral particles or the like; acicular particles such as needle-like particles, spindle-shaped particles, rice ball-shaped particles or the like; plate-shaped particles; or the like. Among these particles, in the consideration of dispersibility of the obtained black composite iron oxide pigment, the spherical particles and the granular particles are preferably used as the core particles.

In the case of the granular particles such as spherical particles, granularated particles, octahedral particles, hexahedral particles, polyhedral particles or the like, the iron oxide particles have an average particle size of usually 0.078 to 0.98 μm, preferably 0.088 to 0.68 μm, more preferably 0.098 to 0.48 μm.

In the case of the acicular particles such as acicular particles, spindle-shaped particles, rice ball-shaped particles or the like, the iron oxide particles have an average particle size (i.e., average major axis diameter) of usually 0.078 to 0.98 μm, preferably 0.088 to 0.68 μm, more preferably 0.098 to 0.48 μm, and a ratio of average major axis diameter to average minor axis diameter (hereinafter referred to merely as "aspect ratio") of usually 2:1 to 20:1, preferably 2:1 to 15:1, more preferably 2:1 to 10:1.

In the case of the plate-shaped particles, the iron oxide particles have an average particle size (i.e., average plate surface diameter) of usually 0.078 to 0.98 μm, preferably 0.088 to 0.68 μm, more preferably 0.098 to 0.48 μm, and a ratio of average plate surface diameter to average thickness (hereinafter referred to merely as "plate ratio") of usually 2:1 to 50:1, preferably 2:1 to 45:1, more preferably 2:1 to 40:1.

When the average particle size of the iron oxide particles is more than 0.98 μm, the obtained black composite iron oxide pigment may be constituted from coarse particles, resulting in poor tinting strength. When the average particle size is less than 0.08 μm, such particles may tend to be agglomerated by the increase of intermolecular force therebetween due to fine particles. As a result, it may become difficult to form a uniform coating layer comprising alkoxysilane compounds or polysiloxanes on the surface of the iron oxide particles, and uniformly adhere an organic blue-based pigment onto the surface of the coating layer.

The iron oxide particles have a geometrical standard deviation value of preferably not more than 2.0, more preferably not more than 1.8, still more preferably not more than 1.6.

When the geometrical standard deviation value is more than 2.0, the iron oxide particles may be prevented from being uniformly dispersed because of the existence of coarse particles therein. As a result, it may become difficult to form a uniform coating layer comprising alkoxysilane compounds or polysiloxanes on the surface of the iron oxide particles, and uniformly adhere an organic blue-based pigment onto the coating layer. The lower limit of the geometrical standard deviation value of the iron oxide particles is 1.01. It may be difficult to industrially produce particles having a geometrical standard deviation value of less than 1.01.

The iron oxide particles have a BET specific surface area value of usually 1 to 200 m²/g, preferably 1.5 to 150 m²/g, more preferably 2.0 to 100 m²/g.

When the BET specific surface area value is less than 1 m²/g, the iron oxide particles may become coarse, or sintering may be caused between the particles, so that the obtained black composite iron oxide pigment also may include coarse particles and, therefore, may be deteriorated in tinting strength. When the BET specific surface area value is more than 200 m²/g, such particles may tend to be agglomerated by the increase of intermolecular force therebetween due to fine particles. As a result, it may become difficult to form a uniform coating layer comprising organosilicon compounds on the surface of the iron oxide particles, and uniformly adhere an organic blue-based pigment onto the coating layer.

As to the hue of the iron oxide particles, the lower limit of L* value thereof is usually 18.0, and the upper limit of L* value thereof is usually about 28.0, preferably about 25.0; the lower limit of a* value thereof is usually more than 0.0, and the upper limit of a* value thereof is usually about 7.0, preferably about 6.0; and the lower limit of b* value thereof is usually about −5.0, and the upper limit of b* value thereof is usually about 2.0, preferably about 1.0.

When the L* value is more than 28.0, the lightness of the iron oxide particles may be too high. As a result, it may become difficult to obtain a black composite iron oxide pigment exhibiting a sufficient blackness. When the a* value is more than 7.0, the iron oxide particles show a strongly reddish color. As a result, it becomes difficult to obtain a black composite iron oxide pigment exhibiting a deep black color.

As to the light resistance of the iron oxide particles, the lower limit of ΔE1* value as described in detail below is usually more than 5.0, and the upper limit of the ΔE1* value is usually 12.0, preferably 10.0, when measured by the below-mentioned evaluation method.

Next, the composite iron oxide particles precursor (B) comprising the afore-mentioned iron oxide particles as core particles, an organosilicon compound coating layer formed on the surface of each of the iron oxide particles, and a carbon black coat formed on at least a part of the coating layer, is described below.

The composite iron oxide particles precursor comprise:
as core particles the afore-mentioned iron oxide particles having an average major axis diameter of 0.078 to 0.98 μm;
a coating formed on the surface of the iron oxide particles, comprising at least one organosilicon compound selected from the group consisting of:
 (1) organosilane compounds obtainable from alkoxysilane compounds, and
 (2) polysiloxanes or modified polysiloxanes, and
a carbon black coat formed on at least a part of the surface of the said coating layer comprising the said organosilicon compound, in an amount of 1 to 30 parts by weight based on 100 parts by weight of the said iron oxide particles.

The properties of the iron oxide particles used as the core particles of the composite iron oxide particles precursor are substantially the same as those of the afore-mentioned iron oxide particles.

The coating formed on the surface of the iron oxide particles comprises at least one organosilicon compound selected from the group consisting of (1) organosilane compounds obtainable from alkoxysilane compounds; and (2) polysiloxanes and modified polysiloxanes selected from the group consisting of (2-a) polysiloxanes modified with at least one compound selected from the group consisting of polyethers, polyesters and epoxy compounds (hereinafter referred to merely as "modified polysiloxanes"), and (2-b) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) may be produced from alkoxysilane compounds represented by the formula (I):

$$R^1_a SiX_{4-a} \quad (I)$$

wherein $R^1$ is $C_6H_5-$, $(CH_3)_2CHCH_2-$ or $n-C_bH_{2b+1}-$ (wherein b is an integer from 1 to 18); X is $CH_3O-$ or $C_2H_5O-$; and a is an integer from 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethoxysilane, methyltrimethoxysilane, dimethyldimethoxysilane and isobutyltrimethoxysilane are preferred, and methyltriethoxysilane, methyltrimethoxysilane and phenyltriethoxysilane are more preferred.

As the polysiloxanes (2), there may be used those compounds represented by the formula (II):

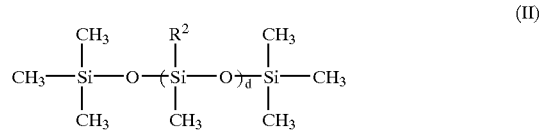

wherein $R^2$ is $H-$ or $CH_3-$, and d is an integer from 15 to 450.

Among these polysiloxanes, in view of the desorption percentage and the adhering effect of the carbon black, polysiloxanes having methyl hydrogen siloxane units are preferred.

As the modified polysiloxanes (2-a), there may be used:
(a) polysiloxanes modified with polyethers represented by the formula (III):

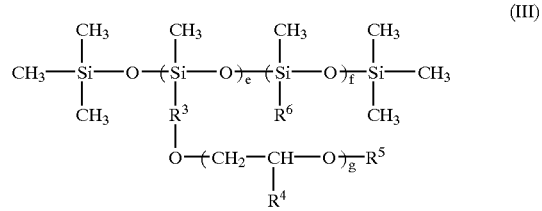

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer from 1 to 15; i, j and k are an integer from 0 to 15; e is an integer from 1 to 50; and f is an integer from 1 to 300;

(b) polysiloxanes modified with polyesters represented by the formula (IV):

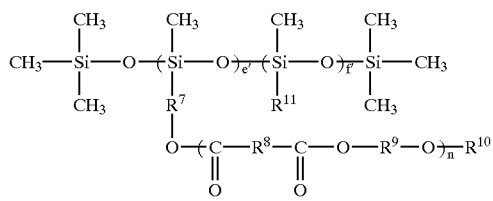

wherein $R^7$, $R^8$ and $R^9$ are —(—$CH_2$—)$_q$— and may be the same or different; $R^{10}$ is —OH, —COOH, —CH=$CH_2$, —C($CH_3$)=$CH_2$ or —(—$CH_2$—)$_r$—$CH_3$; $R^{11}$ is —(—$CH_2$—)$_s$—$CH_3$; n and q are an integer from 1 to 15; r and s are an integer from 0 to 15; e' is an integer from 1 to 50; and f' is an integer from 1 to 300;

(c) polysiloxanes modified with epoxy compounds represented by the formula (V):

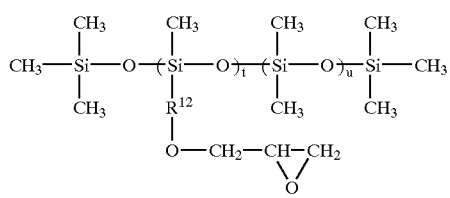

wherein $R^{12}$ is —(—$CH_2$—)$_v$—; v is an integer from 1 to 15; t is an integer from 1 to 50; and u is an integer from 1 to 300; or a mixture thereof.

Among these modified polysiloxanes (2-a), in view of the desorption percentage and the adhering effect of the carbon black, the polysiloxanes modified with the polyethers represented by the formula (III), are preferred.

As the terminal-modified polysiloxanes (2-b), there may be used those represented by the formula (VI):

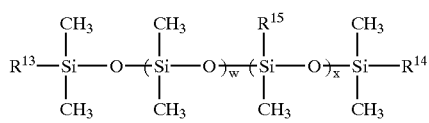

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —(—$CH_2$—)$_y$—; y is an integer from 1 to 15; w is an integer from 1 to 200; and x is an integer from 0 to 100.

Among these terminal-modified polysiloxanes, in view of the desorption percentage and the adhering effect of the carbon black, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the iron oxide particles coated with the organosilicon compounds.

When the coating amount of the organosilicon compounds is less than 0.02% by weight, it may be difficult to adhere the carbon black in a predetermined.

When the coating amount of the organosilicon compounds is more than 5.0% by weight, the carbon black can be adhered in a predetermined. Therefore, it is unnecessary and meaningless to coat the iron oxide particles with such a large amount of the organosilicon compounds.

The amount of the carbon black coat formed is 1 to 30 parts by weight based on 100 parts by weight of the iron oxide particles as core particles.

When the amount of the carbon black coat formed is less than 1 part by weight, the amount of the carbon black may be insufficient, so that it may become difficult to obtain composite iron oxide particles precursor a more excellent blackness.

On the other hand, when the amount of the carbon black coat formed is 1 to 30 parts by weight, the obtained composite iron oxide particles precursor can show a more excellent blackness.

The thickness of carbon black coat formed is preferably not more than 0.04 μm, more preferably not more than 0.03 μm, still more preferably not more than 0.02 μm. The lower limit thereof is more preferably 0.0001 μm.

The carbon black may be adhered either over a whole surface of the coating layer composed of the alkoxysilane or polysiloxanes, or on at least a part of the surface of the coating layer so as to expose a part of the coating layer composed of the alkoxysilane or polysiloxanes to the outer surface of each composite iron oxide particle precursor so that a carbon black coat is formed on the surface of the coating layer. Even though a part of the coating layer composed of the alkoxysilane or polysiloxanes is exposed to the outer surface of each composite iron oxide particle precursor, it is possible to suitably adhere the organic blue-based pigment thereonto.

The particle shape and particle size of the composite iron oxide particles precursor used in the present invention are considerably varied depending upon those of the iron oxide particles as core particles. The composite iron oxide particles precursor have a similar particle shape to that of the iron oxide particles as core particle, and a slightly larger particle size than that of the iron oxide particles as core particles.

More specifically, the composite iron oxide particles precursor (B) used as the core particles in the present invention, have an average particle size as follows.

In the case of the granular particles such as spherical particles, granularated particles, octahedral particles, hexahedral particles, polyhedral particles or the like, the composite iron oxide particles precursor has an average particle size of usually 0.078 to 0.98 μm, preferably 0.088 to 0.68 μm, more preferably 0.098 to 0.48 μm.

In the case of the acicular particles such as needle-like particles, spindle-shaped particles, rice ball-shaped particles or the like, the composite iron oxide particles precursor has an average particle size (i.e., average major axis diameter) of usually 0.078 to 0.98 μm, preferably 0.088 to 0.68 μm, more preferably 0.098 to 0.48 μm, and a ratio of average major axis diameter to average minor axis diameter (hereinafter referred to merely as "aspect ratio") of usually 2:1 to 20:1, preferably 2:1 to 15:1, more preferably 2:1 to 10:1.

In the case of the plate-shaped particles, the composite iron oxide particles precursor has an average particle size (i.e., average plate surface diameter) of usually 0.078 to 0.98 μm, preferably 0.088 to 0.68 μm, more preferably 0.098 to 0.48 μm, and a ratio of average plate surface diameter to average thickness (hereinafter referred to merely as "plate ratio") of usually 2:1 to 50:1, preferably 2:1 to 45:1, more preferably 2:1 to 40:1.

The geometrical standard deviation value of the composite iron oxide particles precursor used as the core particles in the present invention is preferably not more than 2.0, more preferably 1.01 to 1.8, still more preferably 1.01 to 1.6.

The BET specific surface area of the composite iron oxide particles precursor used as the core particles in the present invention, is usually 1 to 200 m$^2$/g, preferably 1 to 150 m$^2$/g, more preferably 2.0 to 100 m$^2$/g.

The lower limit of the L* value of the composite iron oxide particles precursor used as the core particles in the present invention is usually 15.0, and the upper limit thereof is usually 23.5, preferably 23.0; the lower limit of the a* value thereof usually more than 0.0, and the upper limit thereof is usually 7.0, preferably 6.0; and the lower limit of the b* value thereof usually −5.0, and the upper limit thereof is usually 2.0, preferably 1.0.

The lower limit of the ·E value of the composite iron oxide particles precursor used as the core particles in the present invention is usually more than 5.0, and the upper limit thereof is usually 12.0, preferably 10.0.

The desorption percentage of the carbon black from the composite iron oxide particles precursor used as the core particles in the present invention is preferably not more than 20% by weight, more preferably not more than 10% by weight (calculated as C).

In the composite iron oxide particles precursor used as the core particles in the present invention, at least a part of the surface of the iron oxide particles may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon"), if necessary. In this case, the obtained composite iron oxide particles precursor wherein the coating layer composed of hydroxides and/or oxides of aluminum and/or silicon is disposed between the surface of said iron oxide particles and the coating layer comprising said organosilicon compound, can more effectively prevent the organic blue-based pigment adhered thereonto from being desorbed therefrom as compared to the case where the composite iron oxide particles precursor wherein the iron oxide particles are uncoated with hydroxides and/or oxides of aluminum and/or silicon.

The amount of the hydroxides and/or oxides of aluminum and/or silicon coat is preferably 0.01 to 20% by weight (calculated as Al, SiO$_2$ or a sum of Al and SiO$_2$) based on the weight of the iron oxide particles coated.

The particle size, geometrical standard deviation, BET specific surface area and blackness (L* value), wherein the surface of the iron oxide particle is coated with the hydroxides and/or oxides of aluminum and/or silicon, are substantially the same as those of the composite iron oxide particles precursor wherein the iron oxide particle is uncoated with the hydroxides and/or oxides of aluminum and/or silicon.

The desorption percentage of the organic blue-based pigment can be reduced by forming the coating layer composed of hydroxides and/or oxides of aluminum and/or silicon thereon, and is preferably not more than 12%, more preferably not more than 10%.

The composite iron oxide particles precursor (B) used in the present invention can be produced by the following method.

The coating of the iron oxide particles with the alkoxysilane compounds, the polysiloxanes, the modified polysiloxanes or the terminal-modified polysiloxanes, may be conducted (i) by mechanically mixing and stirring the iron oxide particles together with the alkoxysilane compounds, the polysiloxanes, the modified polysiloxanes or the terminal-modified polysiloxanes; or (ii) by mechanically mixing and stirring both the components together while spraying the alkoxysilane compounds, the polysiloxanes, the modified polysiloxanes or the terminal-modified polysiloxanes onto the iron oxide particles. In these cases, substantially whole amount of the alkoxysilane compounds, the polysiloxanes, the modified polysiloxanes or the terminal-modified polysiloxanes added can be applied onto the surfaces of the iron oxide particles.

In order to uniformly coat the surfaces of the iron oxide particles with the alkoxysilane compounds, the polysiloxanes, the modified polysiloxanes or the terminal-modified polysiloxanes, it is preferred that the iron oxide particles are preliminarily diaggregated by using a pulverizer.

As apparatus (a) for mixing and stirring the iron oxide particles with the alkoxysilane compounds, the polysiloxanes, the modified polysiloxanes or the terminal-modified polysiloxanes to form the coating layer thereof, and (b) for mixing and stirring carbon black fine particles with the particles whose surfaces are coated with the alkoxysilane compounds, the polysiloxanes, the modified polysiloxanes or the terminal-modified polysiloxanes to form the carbon black coat, there may be preferably used those apparatus capable of applying a shear force to the particles, more preferably those apparatuses capable of conducting the application of shear force, spatulate-force and compressed-force at the same time. In addition, by conducting the above mixing or stirring treatment (a) of the core particles together with the alkoxysilane compounds, the polysiloxanes, the modified polysiloxanes or the terminal-modified polysiloxanes, at least a part of the alkoxysilane compounds coated on the iron oxide particles may be changed to the organosilane compounds.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred. Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of iron oxide particles with the alkoxysilane compounds, the polysiloxanes, the modified polysiloxanes or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 minutes to 24 hours, preferably 10 minutes to 20 hours. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes or the terminal-modified polysiloxanes added, is preferably 0.15 to 45 parts by weight based on 100 parts by weight of the iron oxide particles. When the amount of the alkoxysilane compounds, the polysiloxanes, the modified polysiloxanes or the terminal-modified polysiloxanes is added in an amount of 0.15 to 45 parts by weight, it is possible to adhere 1 to 30 parts by weight of the carbon black onto 100 parts by weight of the iron oxide particles.

Next, the carbon black fine particles are added to the iron oxide particles coated with the alkoxysilane compounds, the polysiloxanes, the modified polysiloxanes or the terminal-modified polysiloxanes, and the resultant mixture is mixed and stirred to form the carbon black coat on the surfaces of the coating composed of the alkoxysilane compounds, the polysiloxanes, the modified polysiloxanes or the terminal-modified polysiloxanes added. In addition, by conducting the above mixing or stirring treatment (b) of the carbon black fine particles together with iron oxide particles coated with the alkoxysilane compounds, the polysiloxanes, the modified polysiloxanes or the terminal-modified polysiloxanes, at least a part of the alkoxysilane compounds coated on the iron oxide particles may be changed to the organosilane compounds.

The obtained particles may be further subjected to drying or heat-treatment, if required, for example, at a temperature of usually 40 to 150° C., preferably 60 to 120° C. for usually 10 minutes to 12 hours, preferably 30 minutes to 3 hours.

By varying an adding method of the carbon black fine particles, mixing and stirring conditions, and an adhering configuration of the carbon black coat, it is possible to adhere 1 to 30 parts by weight of the carbon black onto the alkoxysilane compounds, the polysiloxanes, the modified polysiloxanes or the terminal-modified polysiloxanes coating layer.

In order to form carbon black onto the coating layer composed of the alkoxysilane compounds, the polysiloxanes, the modified polysiloxanes or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 minutes to 24 hours, preferably 10 minutes to 20 hours. It is preferred to appropriately adjust the stirring speed in the range of usually 2 to 2,000 rpm, preferably 5 to 1,000 rpm, more preferably 10 to 800 rpm.

When the amount of the carbon black fine particles added is more than 30 parts by weight, a sufficient blackness of the resultant composite iron oxide particles precursor can be obtained, but the carbon black tend to be desorbed from the surface of the coating layer because of too large amount of the carbon black adhered, so that it may become difficult to uniformly coat the surface of the composite iron oxide particles precursor with the alkoxysilanes or polysiloxanes, and uniformly adhere the organic blue-based pigment on the surface of the coating layer comprising the alkoxysilanes or polysiloxanes.

At least a part of the surface of the iron oxide particles may be coated with at least one compound selected from the group consisting of hydroxides of aluminum, oxides of aluminum, hydroxides of silicon and oxides of silicon, if required.

The coat of the hydroxides and/or oxides of aluminum and/or silicon may be conducted by adding an aluminum compound, a silicon compound or both the compounds to a water suspension in which the iron oxide particles are dispersed, followed by mixing and stirring, and further adjusting the pH value of the suspension, if required, thereby coating the surfaces of the iron oxide particles with at least one compound selected from the group consisting of hydroxides of aluminum, oxides of aluminum, hydroxides of silicon and oxides of silicon. The thus obtained iron oxide particles coated with the hydroxides and/or oxides of aluminum and/or silicon are then filtered out, washed with water, dried and pulverized. Further, the iron oxide particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the iron oxide particles.

As the silicon compounds, there may be exemplified water glass #3, sodium orthosilicate, sodium metasilicate or the like.

The amount of the silicon compound added is 0.01 to 20% by weight (calculated as $SiO_2$) based on the weight of the iron oxide particles.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the iron oxide particles.

Next, the at least one organosilicon compound selected from the group consisting of organosilane compounds obtainable from alkoxysilane compounds, and polysiloxanes, and the organic blue-based pigment, which are used in the black composite iron oxide pigment of the present invention, will be explained.

The coating layer formed on the surface of the iron oxide particles including the iron oxide particles (A) and the composite iron oxide particles precursor (B) as core particles, comprising the organosilicon compound selected from the group consisting of: (1) organosilane compounds obtainable from alkoxysilane compounds, and (2) polysiloxanes or modified polysiloxanes, is explained.

The organosilane compounds (1) may be produced from alkoxysilane compounds represented by the formula (I):

$$R^1{}_a SiX_{4-a} \tag{I}$$

wherein $R^1$ is $C_6H_5$—, $(CH_3)_2CHCH_2$— or n—$C_bH_{2b+1}$— (wherein b is an integer from 1 to 18); X is $CH_3O$— or $C_2H_5O$—; and a is an integer from 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of the organic blue-based pigments, methyltriethoxysilane, phenyltriethoxysilane, methyltrimethoxysilane, dimethyldimethoxysilane and isobutyltrimethoxysilane are preferred, and methyltriethoxysilane, methyltrimethoxysilane and phenyltriethoxysilane are more preferred.

As the polysiloxanes (2), there may be used those compounds represented by the formula (II):

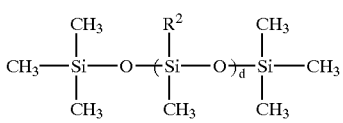

(II)

wherein $R^2$ is H— or $CH_3$—, and d is an integer from 15 to 450.

Among these polysiloxanes, in view of the desorption percentage and the adhering effect of the organic blue-based pigments, polysiloxanes having methyl hydrogen siloxane units are preferred. p1 As the modified polysiloxanes (2-a), there may be used: (a) polysiloxanes modified with polyethers represented by the formula (III):

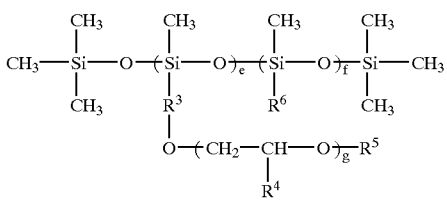

(III)

wherein $R^3$ is —$(—CH_2—)_h$—; $R^4$ is —$(—CH_2—)_i$—$CH_3$; $R^5$ is —OH, —COOH, —CH=$CH_2$, —$C(CH_3)$=—$CH_2$ or —$(—CH_2—)_j$—$CH_3$; $R^6$ is —$(—CH_2—)_k$—$CH_3$; g and h are an integer from 1 to 15; i, j and k are an integer from 0 to 15; e is an integer from 1 to 50; and f is an integer from 1 to 300;

(b) polysiloxanes modified with polyesters represented by the formula (IV):

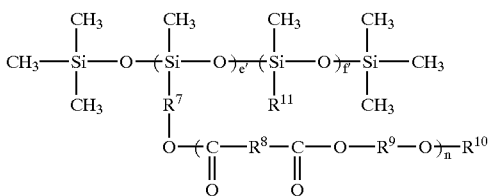

(IV)

wherein $R^7$, $R^8$ and $R^9$ are —$(—CH_2—)_q$— and may be the same or different; $R^{10}$ is —OH, —COOH, —CH=$CH_2$, —$C(CH_3)$=$CH_2$ or —$(—CH_2—)_r$—$CH_3$; $R^{11}$ is —$(—CH_2—)_s$—$CH_3$; n and q are an integer from 1 to 15; r and s are an integer from 0 to 15; e' is an integer from 1 to 50; and f' is an integer from 1 to 300;

(c) polysiloxanes modified with epoxy compounds represented by the formula (V):

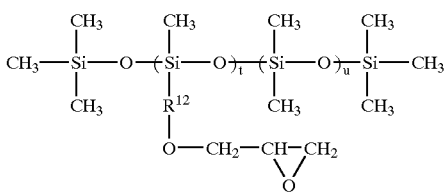

(V)

wherein $R^{12}$ is —$(—CH_2—)_v$—; v is an integer from 1 to 15; t is an integer from 1 to 50; and u is an integer from 1 to 300; or a mixture thereof.

Among these modified polysiloxanes (2-a), in view of the desorption percentage and the adhering effect of the organic blue-based pigments, the polysiloxanes modified with the polyethers represented by the formula (III), are preferred.

As the terminal-modified polysiloxanes (2-b), there may be used those represented by the formula (VI):

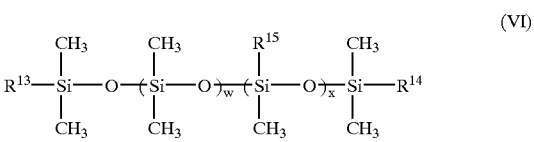

(VI)

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(—CH_2—)_y$—; y is an integer from 1 to 15; w is an integer from 1 to 200; and x is an integer from 0 to 100.

In the consideration of adhering effect and desorption percentage of the organic blue-based pigment, the polysiloxanes having methylhydrogensiloxane units, the polysiloxanes modified with polyethers and the polysiloxanes terminal-modified with carboxylic acids, are preferred The coating amount of the organosilicon compounds is usually 0.02 to 5.0% by weight, preferably 0.03 to 4.0% by weight, more preferably 0.05 to 3.0% by weight (calculated as Si) based on the weight of the core particles coated with the organosilicon compounds.

When the coating amount of the organosilicon compounds is less than 0.02% by weight, it may be difficult to adhere the organic blue-based pigments in a predetermined. When the coating amount of the organosilicon compounds is more than 5.0% by weight, the organic blue-based pigments can be adhered in a predetermined. Therefore, it is unnecessary and meaningless to coat the core particles with such a large amount of the organosilicon compounds.

Examples of the organic blue-based pigments may include phthalocyanine-based pigments such as metal-free phthalocyanine blue, phthalocyanine blue (copper phthalocyanine) and fast sky blue (sulfonated copper phthalocyanine); and alkali blue. In the consideration of acid resistance of the obtained black composite iron oxide pigment, the use of the phthalocyanine-based pigments is preferred.

In particular, in the consideration of the light resistance of the obtained black composite iron oxide pigment, low-chlorinated copper phthalocyanine, NC (non-crystallization)-type copper phthalocyanine and NC-type low-chlorinated copper phthalocyanine are preferably used.

The amount of the organic blue-based pigment adhered is usually 1 to 50 parts by weight, preferably 3 to 45 parts by weight based on 100 parts by weight of the iron oxide particles.

When the amount of the organic blue-based pigment adhered is less than 1 part by weight, the amount of the organic blue-based pigment adhered may be insufficient, so that it may become difficult to obtain a black composite iron oxide pigment having sufficient light resistance and acid resistance as well as an aimed hue.

By adhering 1 to 50 parts by weight of the organic blue-based pigment, the black composite iron oxide pigment showing a deep black color, and excellent light resistance and acid resistance, which is an objective pigment of the present invention, can be obtained The shape and size of the black composite iron oxide pigment according to the present invention may largely vary depending upon those of the iron oxide particles as core particles. The black composite iron oxide pigment usually has a configuration or shape similar to that of the core particles.

Specifically, in the case where the granular iron oxide particles are used as the core particles, the obtained black composite iron oxide pigment according to the present invention has an average particle size of usually 0.08 to 1.0 μm, preferably 0.09 to 0.7 μm, more preferably 0.1 to 0.5 μm. In the case where the acicular or spindle-shaped iron oxide particles are used as the core particles, the obtained black composite iron oxide pigment has an average particle size (i.e., average major axis diameter) of usually 0.08 to 1.0 μm, preferably 0.09 to 0.7 μm, more preferably 0.1 to 0.5 μm, and an aspect ratio of usually 2:1 to 20:1, preferably 2:1 to 15:1, more preferably 2:1 to 10:1. In the case where the plate-shaped iron oxide particles are used as the core particles, the obtained black composite iron oxide pigment has an average particle size (i.e., average plate surface diameter) of usually 0.08 to 1.0 μm, preferably 0.09 to 0.7 μm, more preferably 0.1 to 0.5 μm, and a plate ratio of usually 2:1 to 50:1, preferably 2:1 to 45:1, more preferably 2:1 to 40:1.

When the average particle size of the black composite iron oxide pigment is less than 0.08 μm, such particles may tend to be agglomerated together by the increase in intermolecular force therebetween due to fine particles, so that it may become difficult to disperse the black composite iron oxide pigment in vehicles or resin compositions. When the average particle size of the black composite iron oxide pigment is more than 1.0 μm, the obtained composite iron oxide pigment may tend to be prevented from being uniformly dispersed in vehicles or resin compositions because of too large particles.

The black composite iron oxide pigment of the present invention has a geometrical standard deviation value of particle sizes of usually not more than 2.0. When the geometrical standard deviation value is more than 2.0, the black composite iron oxide pigment may tend to be prevented from being uniformly dispersed in vehicles or resin compositions because of the existence of coarse particles therein. In the consideration of uniform dispersion in vehicles or resin compositions, the geometrical standard deviation value is preferably not more than 1.8, more preferably not more than 1.6. Further, in the consideration of industrial productivity, the lower limit of the geometrical standard deviation value is 1.01.

The black composite iron oxide pigment of the present invention has a BET specific surface area value of usually 1 to 200 m$^2$/g, preferably 1.5 to 150 m$^2$/g, more preferably 2.0 to 100 m$^2$/g. When the BET specific surface area value of the black composite iron oxide pigment is less than 1 m$^2$/g, the obtained black composite iron oxide pigment may become coarse particles, or sintering may be caused within or between the particles, thereby adversely affecting the dispersibility in vehicles or resin compositions. When the BET specific surface area value of the black composite iron oxide pigment is more than 200 m$^2$/g, such particles may tend to be agglomerated together by the increase in intermolecular force therebetween due to fine particles, resulting in deteriorated dispersibility in vehicles or resin compositions.

As to the hue of the black composite iron oxide pigment according to the present invention, the lower limit of L* value thereof is usually 16.0, and the upper limit of the L* value is usually 23.0, preferably 22.0, more preferably 21.0; the lower limit of the a* value is usually –2.0, and the upper limit of a* value thereof is usually 0.0, preferably –0.1, more preferably –0.2; and the lower limit of b* value thereof is usually –6.5, and the upper limit of the b* value is usually 1.5, preferably 1.0.

Among the black composite iron oxide pigments of the present invention, as to the hue of the black composite iron oxide pigments produced by using the composite iron oxide particles precursor as the core particles, the lower limit of L* value thereof is usually 14.5, and the upper limit of the L* value is usually 21.0, preferably 20.0, more preferably 19.0; the lower limit of the a* value is usually –2.0, and the upper limit of a* value thereof is usually 0.0, preferably –0.1, more preferably –0.2; and the lower limit of b* value thereof is usually –6.5, and the upper limit of the b* value is usually 1.5, preferably 1.0.

When the L* value is more than 23.0, the lightness of the black composite iron oxide pigment is too high. As a result, the obtained composite iron oxide pigment fails to exhibit an excellent blackness. When the a* value is more than 0.0, the obtain composite iron oxide pigment shows a strongly reddish color. As a result, it may become difficult to obtain a black composite iron oxide pigment exhibiting a deep black color.

The desorption percentage of the organic blue-based pigment from the black composite iron oxide pigment is preferably not more than 20%, more preferably not more than 15%. When the desorption percentage of the organic blue-based pigment is more than 20%, the black composite iron oxide pigment may tend to be inhibited from being uniformly dispersed in vehicles or resin compositions by the desorbed organic blue-based pigment, upon the production of paints or resin compositions.

As to the heat resistance of the black composite iron oxide pigment, the heat-resisting temperature thereof is usually not less than 280° C. In particular, in the case where the zinc-containing magnetite particles are used as the core particles, the heat-resisting temperature of the black composite iron oxide pigment is usually not less than 300° C. Further, in the case where the hematite particles or the Mn-containing hematite particles are used as the core particles, the heat-resisting temperature of the black composite iron oxide pigment is usually not less than 500° C.

As to the light resistance of the black composite iron oxide pigment, the ΔE1* value thereof is usually not more than 5.0, preferably not more than 4.0 when measured by the below-mentioned evaluation method.

As to the acid resistance of the black composite iron oxide pigment, the ΔE2* value thereof is usually not more than 1.50, preferably not more than 1.30 when measured by the below-mentioned evaluation method.

In the black composite iron oxide pigment of the present invention, the surface of the iron oxide particles may be previously coated with at least one compound selected from the group consisting of hydroxides of aluminum, oxides of aluminum, hydroxides of silicon and oxides of silicon. The black composite iron oxide pigment produced by using the iron oxide particles coated with the hydroxides and/or oxides of aluminum and/or silicon, can be more effectively prevented from undergoing desorption of organic blue-based pigment from the surface of the iron oxide particles, as compared to those using the iron oxide particles uncoated with the hydroxides and/or oxides of aluminum and/or silicon.

The amount of the hydroxides and/or oxides of aluminum and/or silicon coat is usually 0.01 to 20% by weight (calculated as Al, SiO$_2$ or a sum of Al and SiO$_2$) based on the weight of the iron oxide particles coated with the hydroxides and/or oxides of aluminum and/or silicon coat.

When the amount of the hydroxides and/or oxides of aluminum and/or silicon coat is less than 0.01% by weight, it is difficult to attain the effect of reducing the desorption percentage of organic blue-based pigment. As long as the amount of the hydroxides and/or oxides of aluminum and/or silicon coat lies within the range of 0.01 to 20% by weight, the effect of reducing the desorption percentage of organic blue-based pigment can be sufficiently exhibited. Therefore, it is unnecessary and meaningless to form the hydroxides and/or oxides of aluminum and/or silicon coat in an amount of more than 20% by weight.

The black composite iron oxide pigment using the iron oxide particles wherein the hydroxides and/or oxides of aluminum and/or silicon coat is disposed between the surface of said iron oxide particles and coating layer comprising said organosilicon compound according to the second aspect of the present invention is substantially the same in particle size, geometrical standard deviation value, BET specific surface area value, hue ($L^*$ value, $a^*$ value and $b^*$ value), heat resistance, light resistance $\Delta E1^*$ value and acid resistance $\Delta E2^*$ value as those of the black composite iron oxide pigment produced by using the iron oxide particles having no hydroxides and/or oxides of aluminum and/or silicon coat as core particles according to the first aspect of the present invention. Thus, the desorption percentage of the organic blue-based pigment from the black composite iron oxide pigment may be improved by forming the hydroxides and/or oxides of aluminum and/or silicon coat on the surface of the iron oxide particles, and is preferably not more than 15%, more preferably not more than 10%.

The black composite iron oxide pigment produced by using the composite iron oxide particles precursor as core particles according to the third aspect of the present invention is substantially the same in particle size, geometrical standard deviation value, BET specific surface area value, hue ($a^*$ value and $b^*$ value), desorption percentage of organic blue-based pigment, heat resistance, light resistance $\Delta E1^*$ value and acid resistance $\Delta E2^*$ value as those of the black composite iron oxide pigment using the iron oxide particles as core particles according to the first aspect of the present invention.

The black composite iron oxide pigment produced by using as core particles, the composite iron oxide particles precursor produced from the iron oxide particles wherein the hydroxides and/or oxides of aluminum and/or silicon coat is disposed between the surface of said iron oxide particles and coating layer comprising said organosilicon compound according to the fourth aspect of the present invention is substantially the same in particle size, geometrical standard deviation value, BET specific surface area value, hue ($a^*$ value and $b^*$ value), desorption percentage of organic blue-based pigment, heat resistance, light resistance $\Delta E1^*$ value and acid resistance $\Delta E2^*$ value as those of the black composite iron oxide pigment produced by using the iron oxide particles having the hydroxides and/or oxides of aluminum and/or silicon coat as core particles according to the second aspect of the present invention, and is substantially the same in blackness as that of the black composite iron oxide pigment produced by using as core particles, the composite iron oxide particles precursor produced from the iron oxide particles having no hydroxides and/or oxides of aluminum and/or silicon coat according to the third aspect of the present invention.

Next, the paint containing the black composite iron oxide pigment according to the present invention will be described.

The coating film formed from a solvent-based paint containing the black composite iron oxide pigment according to the first aspect of the present invention has a gloss of usually not less than 75.0%, preferably not less than 80.0%, an acid resistance ($\Delta G$ value) of usually not more than 10.0, preferably not more than 9.5, a light resistance ($\Delta E3^*$ value) of usually not more than 5.0, preferably not more than 4.5, and a heat resistance (heat-resisting temperature) of not less than 300° C., preferably not less than 305° C. As to the hue of the coating film, the $L^*$ value thereof is usually 16.0 to 23.0, preferably 16.0 to 22.0, more preferably 16.0 to 21.0; the $a^*$ value thereof is usually −2.0 to 0.0, preferably −2.0 to −0.1, more preferably −2.0 to −0.2; and the $b^*$ value thereof is usually −6.5 to 1.5, preferably −6.5 to 1.0.

The coating film formed from a solvent-based paint containing the black composite iron oxide pigment according to the second aspect of the present invention has a gloss of usually not less than 80.0%, preferably not less than 850.0%, an acid resistance ($\Delta G$ value) of usually not more than 9.5, preferably not more than 9.0, a light resistance ($\Delta E3^*$ value) of usually not more than 4.5, preferably not more than 4.0, and a heat resistance (heat-resisting temperature) of not less than 305° C., preferably not less than 310° C. As to the hue of the coating film, the $L^*$ value thereof is usually 16.0 to 23.0, preferably 16.0 to 22.0, more preferably 16.0 to 21.0; the $a^*$ value thereof is usually −2.0 to 0.0, preferably −2.0 to −0.1, more preferably −2.0 to −0.2; and the $b^*$ value thereof is usually −6.5 to 1.5, preferably −6.5 to 1.0.

The coating film formed from a solvent-based paint containing the black composite iron oxide pigment according to the third aspect of the present invention has a gloss of usually not less than 80.0%, preferably not less than 85.0%, an acid resistance ($\Delta G$ value) of usually not more than 9.0, preferably not more than 8.5, a light resistance ($\Delta E3^*$ value) of usually not more than 4.5, preferably not more than 4.0, and a heat resistance (heat-resisting temperature) of not less than 305° C., preferably not less than 3105° C. As to the hue of the coating film, the $L^*$ value thereof is usually 14.5 to 21.0, preferably 14.5 to 20.0, more preferably 14.5 to 19.0; the $a^*$ value thereof is usually −2.0 to 0.0, preferably −2.0 to −0.1, more preferably −2.0 to −0.2; and the $b^*$ value thereof is usually −6.5 to 1.5, preferably −6.5 to 1.0.

The coating film formed from a solvent-based paint containing the black composite iron oxide pigment according to the fourth aspect of the present invention has a gloss of usually not less than 85.0%, preferably not less than 90.0%, an acid resistance ($\Delta G$ value) of usually not more than 8.5, preferably not more than 8.0, a light resistance ($\Delta E3^*$ value) of usually not more than 4.0, preferably not more than 3.5, and a heat resistance (heat-resisting temperature) of not less than 310° C., preferably not less than 315° C. As to the hue of the coating film, the $L^*$ value thereof is usually 14.5 to 21.0, preferably 14.5 to 20.0, more preferably 14.5 to 19.0; the $a^*$ value thereof is usually −2.0 to 0.0, preferably −2.0 to −0.1, more preferably −2.0 to −0.2; and the $b^*$ value thereof is usually −6.5 to 1.5, preferably −6.5 to 1.0.

The coating film formed from a water-based paint containing the black composite iron oxide pigment according to the first aspect of the present invention has a gloss of usually not less than 70.0%, preferably not less than 75.0%, an acid resistance ($\Delta G$ value) of usually not more than 10.0, preferably not more than 9.5, a light resistance ($\Delta E3^*$ value) of usually not more than 5.0, preferably not more than 4.5, and a heat resistance (heat-resisting temperature) of not less than 300° C., preferably not less than 305° C. As to the hue of the coating film, the $L^*$ value thereof is usually 16.0 to 23.0, preferably 16.0 to 22.0, more preferably 16.0 to 21.0; the $a^*$ value thereof is usually −2.0 to 0.0, preferably −2.0 to −0.1, more preferably −2.0 to −0.2; and the b* value thereof is usually −6.5 to 1.5, preferably −6.5 to 1.0.

The coating film formed from a water-based paint containing the black composite iron oxide pigment according to the second aspect of the present invention has a gloss of usually not less than 75.0%, preferably not less than 80.0%, an acid resistance (ΔG value) of usually not more than 9.5, preferably not more than 9.0, a light resistance (ΔE3* value) of usually not more than 4.5, preferably not more than 4.0, and a heat resistance (heat-resisting temperature) of not less than 305° C., preferably not less than 310° C. As to the hue of the coating film, the L* value thereof is usually 16.0 to 23.0, preferably 16.0 to 22.0, more preferably 16.0 to 21.0; the a* value thereof is usually −2.0 to 0.0, preferably −2.0 to −0.1, more preferably −2.0 to −0.2; and the b* value thereof is usually −6.5 to 1.5, preferably −6.5 to 1.0.

The coating film formed from a water-based paint containing the black composite iron oxide pigment according to the third aspect of the present invention has a gloss of usually not less than 75.0%, preferably not less than 80.0%, an acid resistance (ΔG value) of usually not more than 9.0, preferably not more than 8.5, a light resistance (ΔE3* value) of usually not more than 4.5, preferably not more than 4.0, and a heat resistance (heat-resisting temperature) of not less than 305° C., preferably not less than 310° C. As to the hue of the coating film, the L* value thereof is usually 14.5 to 21.0, preferably 14.5 to 20.0, more preferably 14.5 to 19.0; the a* value thereof is usually −2.0 to 0.0, preferably −2.0 to −0.1, more preferably −2.0 to −0.2; and the b* value thereof is usually −6.5 to 1.5, preferably −6.5 to 1.0.

The coating film formed from a water-based paint containing the black composite iron oxide pigment according to the fourth aspect of the present invention has a gloss of usually not less than 80.0%, preferably not less than 85.0%, an acid resistance (ΔG value) of usually not more than 8.5, preferably not more than 8.0, a light resistance (ΔE3* value) of usually not more than 4.0, preferably not more than 3.5, and a heat resistance (heat-resisting temperature) of not less than 310° C., preferably not less than 315° C. As to the hue of the coating film, the L* value thereof is usually 14.5 to 21.0, preferably 14.5 to 20.0, more preferably 14.5 to 19.0; the a* value thereof is usually −2.0 to 0.0, preferably −2.0 to −0.1, more preferably −2.0 to −0.2; and the b* value thereof is usually −6.5 to 1.5, preferably −6.5 to 1.0.

The amount of the black composite iron oxide pigment blended in the paint according to the present invention is 1.0 to 100 parts by weight based on 100 parts by weight of a paint base material. In the consideration of handling property of the paint, the amount of the black composite iron oxide pigment blended in the paint is preferably 2.0 to 100 parts by weight, more preferably 5.0 to 100 parts by weight based on 100 parts by weight of the paint base material.

The paint base material comprises a resin and a solvent, and may further contain, if required, a defoamer, an extender pigment, a drying promoter, a surfactant, a curing accelerator, assistants or the like.

Examples of the resin used in the paint base material for solvent-based paints may include those ordinarily used for solvent-based paints such as acrylic resins, alkyd resins, polyester resins, polyurethane resins, epoxy resins, phenol resins, melamine resins and amino resins. Examples of the resins used in the paint base material for water-based paints may include those ordinarily used for water-based paints such as water-soluble alkyd resins, water-soluble melamine resins, water-soluble acrylic resins and water-soluble urethane emulsion resins.

As the solvent for solvent-based paints, there may be exemplified those solvents ordinarily used for solvent-based paints such as toluene, xylene, butyl acetate, methyl acetate, methyl isobutyl ketone, butyl cellosolve, ethyl cellosolve, butyl alcohol and aliphatic hydrocarbons.

As the solvents for water-based paints, there may be exemplified those solvents ordinarily used in combination with water for water-based paints, such as butyl cellosolve and butyl alcohol.

As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" (all produced by SUN NOPCO CO., LTD.), "ANTI-FOAM 08 (tradename)" and "EMARGEN 903 (tradename)" (both produced by KAO CO., LTD.), or the like.

Next, the resin composition tinted with the black composite iron oxide pigment according to the present invention is described.

The resin composition tinted with the black composite iron oxide pigment according to the first aspect of the present invention exhibits a dispersing condition of the rank 4 or 5 when visually observed by the below-mentioned evaluation method, a heat resistance (heat-resisting temperature) of usually not less than 225° C., preferably not less than 230° C., and a light resistance (ΔE5* value) of usually not more than 5.0, preferably not more than 4.5. As to the hue of the resin composition, the L* value thereof is usually 16.0 to 23.5, preferably 16.0 to 22.5, more preferably 16.0 to 21.5; the a* value thereof is usually −2.0 to 0.0, preferably −2.0 to −0.1, more preferably −2.0 to −0.2; and the b* value thereof is usually −6.5 to 1.5, preferably −6.5 to 1.0.

The resin composition tinted with the black composite iron oxide pigment according to the second aspect of the present invention exhibits a dispersing condition of the rank 4 or 5 when visually observed by the below-mentioned evaluation method, a heat resistance (heat-resisting temperature) of usually not less than 230° C., preferably not less than 235° C., and a light resistance (ΔE5* value) of usually not more than 4.5, preferably not more than 4.0. As to the hue of the resin composition, the L* value thereof is usually 16.0 to 23.5, preferably 16.0 to 22.5, more preferably 16.0 to 21.5; the a* value thereof is usually −2.0 to 0.0, preferably −2.0 to −0.1, more preferably −2.0 to −0.2; and the b* value thereof is usually −6.5 to 1.5, preferably −6.5 to 1.0.

The resin composition tinted with the black composite iron oxide pigment according to the third aspect of the present invention exhibits a dispersing condition of the rank 4 or 5 when visually observed by the below-mentioned evaluation method, a heat resistance (heat-resisting temperature) of usually not less than 230° C., preferably not less than 235° C., and a light resistance (ΔE5* value) of usually not more than 4.5, preferably not more than 4.0. As to the hue of the resin composition, the L* value thereof is usually 14.5 to 21.5, preferably 14.5 to 20.5, more preferably 14.5 to 19.5; the a* value thereof is usually −2.0 to 0.0, preferably −2.0 to −0.1, more preferably −2.0 to −0.2; and the b* value thereof is usually −6.5 to 1.5, preferably −6.5 to 1.0.

The resin composition tinted with the black composite iron oxide pigment according to the fourth aspect of the present invention exhibits a dispersing condition of the rank 4 or 5 when visually observed by the below-mentioned evaluation method, a heat resistance (heat-resisting temperature) of usually not less than 235° C., preferably not less than 240° C., and a light resistance (ΔE5* value) of usually not more than 4.0, preferably not more than 3.5. As to the hue of the resin composition, the L* value thereof is usually 14.5 to 21.5, preferably 14.5 to 20.5, more preferably 14.5 to 19.5; the a* value thereof is usually −2.0 to 0.0, preferably −2.0 to −0.1, more preferably −2.0 to −0.2; and the b* value thereof is usually −6.5 to 1.5, preferably −6.5 to 1.0.

The amount of the black composite iron oxide pigment blended in the resin composition according to the present invention is 0.5 to 200 parts by weight based on 100 parts by weight of a base material of the resin composition. In the consideration of handling property of the resin composition, the amount of the black composite iron oxide pigment blended therein is preferably 1.0 to 150 parts by weight, more preferably 2.5 to 100 parts by weight based on 100 parts by weight of the base material.

The base material of the resin composition according to the present invention comprises the black composite iron oxide pigment and known thermoplastic resins, and may further contain, if required, additives such as lubricants, plasticizers, antioxidants, ultraviolet light absorbers, various stabilizers or the like.

Examples of the reins may include natural rubbers, synthetic rubbers, thermoplastic resins, e.g., polyolefins such as polyethylene, polypropylene, polybutene and polyisobutylene, polyvinyl chloride, styrene polymers and polyamides, or the like.

The additive may be added in an amount of usually not more than 50% by weight based on the total amount of the black composite iron oxide pigment and the resin. When the amount of the additive added is more than 50% by weight, the obtained resin composition is deteriorated in moldability.

The resin composition of the present invention can be produced by previously intimately mixing the raw resin material with the black composite iron oxide pigment, and then kneading the resultant mixture using a kneader or an extruder under heating while applying a strong shear force thereto in order to deaggregate the agglomerated black composite iron oxide pigment and uniformly disperse the black composite iron oxide pigment in the resin. Then, the obtained resin composition is molded into an aimed shape upon use.

Next, the process for producing the black composite iron oxide pigment according to the present invention is described.

The granular magnetite particles used as the core particles in the present invention can be produced by a so-called wet-method of passing an oxygen-containing gas through a suspension containing a ferrous hydroxide colloid obtained by reacting an aqueous ferrous salt solution with alkali hydroxide, for conducting the oxidation reaction.

The granular manganese-containing hematite particles used as the core particles in the present invention can be produced by heat-treating either (i) particles obtained by coating the granular magnetite particles produced by the above wet method with a manganese compound in an amount of usually 8 to 150 atm % based on whole Fe, or (ii) manganese-containing magnetite particles obtained by conducting the above wet method for the production of granular magnetite particles in the presence of manganese to produce magnetite particles containing manganese in an amount of usually 8 to 150 atm % based on whole Fe and then subjecting the obtained magnetite particles to filtration, water-washing and drying, at a temperature of usually 750 to 1000° C. in air.

The thus obtained manganese-containing hematite particles are preferred from the standpoint of dispersibility since these particles are non-magnetic particles and, therefore, can be prevented from being magnetically agglomerated together.

The black composite iron oxide pigment of the present invention can be produced by mixing the iron oxide particles as core particles with alkoxysilanes or polysiloxanes to coat the surface of the iron oxide particles with the alkoxysilanes or polysiloxanes, and then mixing the thus obtained iron oxide particles coated with the alkoxysilanes or polysiloxanes with the organic blue-based pigment.

The coating of the iron oxide particles (A), or the composite iron oxide particles precursor (B) as core particles with the alkoxysilane compounds, the polysiloxanes, the modified polysiloxanes, or the terminal-modified polysiloxanes, may be conducted (i) by mechanically mixing and stirring the iron oxide particles (A), or the composite iron oxide particles precursor (B) together with the alkoxysilane compounds, the polysiloxanes, the modified polysiloxanes, or the terminal-modified polysiloxanes; or (ii) by mechanically mixing and stirring both the components together while spraying the alkoxysilane compounds, the polysiloxanes, the modified polysiloxanes, or the terminal-modified polysiloxanes onto the core particles. In these cases, substantially whole amount of the alkoxysilane compounds, the polysiloxanes, the modified polysiloxanes, or the terminal-modified polysiloxanes added can be applied onto the surfaces of the core particles.

In addition, by conducting the above-mentioned mixing or stirring treatment (i) of the iron oxide particles (A), or the composite iron oxide particles precursor (B) as core particles together with the alkoxysilane compounds, at least a part of the alkoxysilane compounds coated on the core particles may be changed to the organosilane compounds. In this case, there is also no affection against the formation of the organic blue-based pigment coat thereon.

In order to uniformly coat the surfaces of the iron oxide particles (A), or the composite iron oxide particles precursor (B) as core particles with the alkoxysilane compounds, the polysiloxanes, the modified polysiloxanes, or the terminal-modified polysiloxanes, it is preferred that the iron oxide particles (A) or the composite iron oxide particles precursor (B) are preliminarily diaggregated by using a pulverizer.

As apparatus (a) for mixing and stirring treatment (i) of the core particles with the alkoxysilane compounds, the polysiloxanes, the modified polysiloxanes, or the terminal-modified polysiloxanes to form the coating layer thereof, and as apparatus (b) for mixing and stirring treatment (ii) of the organic blue-based pigment with the core particles whose surfaces are coated with the alkoxysilane compounds, the polysiloxanes, the modified polysiloxanes, or the terminal-modified polysiloxanes to form the organic blue-based pigment coat, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilanes or polysiloxanes added is usually 0.15 to 45 parts by weight based on 100 parts by weight of the iron oxide particles. When the amount of the alkoxysilanes or polysiloxanes added is less than 0.15 part by weight, it may become difficult to adhere the organic blue-based pigment in such an amount sufficient to improve a blackness of the obtained pigment. When the alkoxysilanes or polysiloxanes are added in an amount of 0.15 to 45 parts by weight, it is possible to adhere a sufficient amount of the organic blue-based pigment onto the iron oxide particles. Therefore, it is unnecessary and meaningless to add the alkoxysilanes or polysiloxanes in an amount of more than 45 parts by weight.

Next, the organic blue-based pigment are added to the iron oxide particles (A), or the composite iron oxide particles precursor (B) as core particles, which are coated with the alkoxysilane compounds, the polysiloxanes, the modified polysiloxanes, or the terminal-modified polysiloxanes, and the resultant mixture is mixed and stirred to form the organic blue-based pigment coat on the surfaces of the coating layer composed of the alkoxysilane compounds, the polysiloxanes, the modified polysiloxanes or the terminal-modified polysiloxanes. The drying or heat-treatment may be conducted.

It is preferred that the organic blue-based pigment are added little by little and slowly, especially about 5 to 60 minutes.

In order to form organic blue-based pigment coat onto the coating layer composed of the alkoxysilane compounds, the polysiloxanes, the modified polysiloxanes, or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the organic blue-based pigment added is usually 1 to 50 parts by weight based on 100 parts by weight of the iron oxide particles. When the amount of the organic blue-based pigment added is less than 1 part by weight, the amount of the organic blue-based pigment adhered may be insufficient, thereby failing to exhibit a deep black color.

By adhering 1 to 50 parts by weight of the organic blue-based pigment, the black composite iron oxide pigment showing a deep black color, and excellent light resistance and acid resistance, which is an objective pigment of the present invention, can be obtained In case of drying the obtained composite iron oxide particles, the temperature is usually 40 to 200° C., preferably 60 to 150° C. The treating time of these steps is usually from 10 minutes to 12 hours, preferably from 30 minutes to 3 hours.

When the obtained composite iron oxide particles is subjected to the above step, the alkoxysilane compounds used as the coating thereof are finally converted into organosilane compounds.

If required, prior to mixing and stirring with the alkoxysilane compounds or polysiloxanes, the iron oxide particles may be preliminarily coated with at least one compound selected from the group consisting of hydroxides of aluminum, oxides of aluminum, hydroxides of silicon and oxides of silicon to form an hydroxides and/or oxides of aluminum and/or silicon coat thereon.

At least a part of the surface of the iron oxide particles may be coated with at least one compound selected from the group consisting of hydroxides and/or oxides of aluminum and/or silicon, if required, in advance of mixing and stirring with the alkoxysilane compounds, the polysiloxanes, the modified polysiloxanes or the terminal-modified polysiloxanes.

The coat of the hydroxides and/or oxides of aluminum and/or silicon may be conducted by adding an aluminum compound, a silicon compound or both the compounds to a water suspension in which the iron oxide particles are dispersed, followed by mixing and stirring, and further adjusting the pH value of the suspension, if required, thereby coating the surfaces of the iron oxide particles with hydroxides and/or oxides of aluminum and/or silicon. The thus obtained iron oxide particles coated with the hydroxides and/or oxides of aluminum and/or silicon are then filtered out, washed with water, dried and pulverized. Further, the iron oxide particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the iron oxide particles. When the amount of the aluminum compound added is less than 0.01% by weight, it may be difficult to sufficiently coat the surfaces of the iron oxide particles with hydroxides and/or oxides of aluminum, thereby failing to improve the effective reduction of the organic blue-based pigment desorption percentage. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the iron oxide particles.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the iron oxide particles.

The point of the present invention is that the black composite iron oxide pigment produced by adhering an organic blue-based pigment onto the surface of iron oxide particles through a coating layer comprising organosilicon compounds can exhibit not only a deep black color, but also excellent acid resistance and light resistance.

The reason why the black composite iron oxide pigment of the present invention can exhibit a deep black color is considered as follows, though not clearly determined. That is, by selectively using the organic blue-based pigment for reducing a reddish color of iron oxide particles, and using the organosilicon compounds such as alkoxysilanes or polysiloxanes as a gluing agent for strongly adhering the organic blue-based pigment onto the surface of the iron oxide particles, the a* value of the obtained black composite iron oxide pigment as an index representing a reddish color thereof can be reduced to not more than 0.

The reason why the black composite iron oxide pigment of the present invention can exhibit an excellent acid resistance is considered by the present inventors as follows. That is, since the organic blue-based pigment having an excellent acid resistance is adhered onto the surface of the iron oxide particles through a coating layer comprising organosilane compounds obtainable from alkoxysilanes, or polysiloxanes, it is possible to shield inherent properties of the iron oxide particles such as oxidation susceptibility and high surface activity, thereby more effectively exhibiting inherent properties of the organic blue-based pigment.

The reason why the black composite iron oxide pigment of the present invention can exhibit an excellent light resistance is considered by the present inventors as follows. That is, since the iron oxide particles inherently showing a poor light resistance is covered with the coating layer comprising the organosilicon compounds such as organosilane compounds or polysiloxanes having an excellent light resistance, and further the organic blue-based pigment having an excellent light resistance is adhered on the coating layer, the obtained black composite iron oxide pigment can be considerably improved in light resistance.

The reason why the amount of the organic blue-based pigment desorbed from the surface of the black composite iron oxide pigment of the present invention is reduced, is considered by the present inventors as follows. That is, metalloxane bonds ($\equiv$Si—O—M, wherein M represents a metal atom contained in the iron oxide particle, such as Si, Al or Fe) are formed between the metal elements such as Si, Al or Fe which are contained within the iron oxide particle or present at the surface thereof, and alkoxy groups of the alkoxysilane compounds, so that the organosilicon compounds onto which the organic blue-based pigment is adhered, can be more strongly bonded to the surface of the iron oxide particle.

The reason why the black composite iron oxide pigment of the present invention can exhibit an excellent dispersibility in vehicles or resin compositions, is considered by the present inventors as follows. That is, since the amount of the organic blue-based pigment desorbed from the surface of the black composite iron oxide pigment is small, the black composite iron oxide pigment can be dispersed in the vehicles or resin compositions without disturbance by the desorbed organic blue-based pigment. In addition, since the organic blue-based pigment is adhered onto the surface of the black composite iron oxide pigment, irregularities are formed on the surface of the respective pigment particles, thereby effectively preventing the contact between the particles.

Also, the black composite iron oxide pigment according to the third aspect of the present invention can show an excellent blackness because carbon black is adhered onto the surface of the iron oxide particles though a coating layer comprising the organosilicon compound such as organosilane compounds obtainable from alkoxysilanes, or polysiloxanes.

The paint and resin composition of the present invention contain such a black composite iron oxide pigment and, therefore, can exhibit excellent light resistance and acid resistance.

The black composite iron oxide pigment of the present invention can exhibit not only a deep black color but also excellent acid resistance and light resistance and, therefore, is suitably used as a black pigment.

Further, the paint and resin composition of the present invention can exhibit excellent light resistance, heat resistance and acid resistance, and is prepared using the harmless black composite iron oxide pigment. Therefore, the paint and resin composition can be suitably used as black paints and resin compositions which are free from environmental pollution.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size of iron oxide particles, organic blue-based pigment, and composite iron oxide particles were respectively expressed by average values (measured in a predetermined direction) of about 350 particles which were sampled from a micrograph obtained by magnifying an original electron micrograph by four times in each of the longitudinal and transverse directions.

(2) The geometrical standard deviation of the particle size of the particles was expressed by values obtained by the following method. That is, the particle sizes of the particles were measured from the above-magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes of the particles corresponding to the number of particles of 50% and 84.13%, respectively, were read from the graph, and the geometrical standard deviation was measured from the following formula:

Geometrical standard deviation={particle size of the particle corresponding to 84.13% under integration sieve}/{particle sizes of the particle (geometrical average diameter)

corresponding to 50% under integration sieve}

The more the geometrical standard deviation closer to 1.0, the more excellent the particle size distribution of the particles.

(3) The specific surface area was expressed by values measured by a BET method.

(4) The amounts of Mn, Al, Zn and Si which were present within iron oxide particles or on the surfaces thereof, the amount of Si contained in organosilicon compounds, were measured by a fluorescent X-ray spectroscopy device 3063M (manufactured by RIGAKU DENKI KOGYO CO., LTD.) according to JIS K0119 "General rule of fluorescent X-ray analysis".

Meanwhile, the amount of Si contained in oxides of silicon, hydroxides of silicon and organosilicon compounds coated on the surfaces of the iron oxide particles or the composite iron oxide particles precursor, is expressed by the value obtained by subtracting the amount of Si measured prior to the respective treatment steps from that measured after the respective treatment steps.

(5) The amount of carbon black coat of the composite iron oxide particles precursor, and the amount of organic blue-based pigment adhered in the black composite iron oxide particles was measured by "Horiba Metal, Carbon and Sulfur Analyzer EMIA-2200 Model" (manufactured by HORIBA SEISAKUSHO CO., LTD.).

(6) The desorption percentage (%) of organic blue-based pigment desorbed from the black composite iron oxide particles was measured by the following method.

That is, 3 g of the black composite iron oxide particles and 40 ml of ethanol were placed in a 50-ml precipitation pipe and then was subjected to ultrasonic dispersion for 20 minutes. Thereafter, the obtained dispersion was allowed to stand for 120 minutes, and separated the organic blue-based pigment desorbed from the black composite iron oxide particles on the basis of the difference in specific gravity therebetween. Next, the thus separated composite iron oxide particles were mixed again with 40 ml of ethanol, and the obtained mixture was further subjected to ultrasonic dispersion for 20 minutes. Thereafter, the obtained dispersion was allowed to stand for 120 minutes, thereby separating the black composite iron oxide particles and organic blue-based pigment desorbed, from each other. The thus separated composite iron oxide particles were dried at 80° C. for one hour, and then the residual amount of the organic blue-based pigment was measured by the "Horiba Metal, Carbon and Sulfur Analyzer EMIA-2200 Model" (manufactured by HORIBA SEISAKUSHO CO., LTD.). The desorption percentage (%) was calculated according to the following formula:

$$\text{Desorption percentage } (\%) = \{(W_a - W_e)/W_a\} \times 100$$

wherein $W_a$ represents an amount of organic blue-based pigment initially adhered on the black composite iron oxide particles; and $W_e$ represents an amount of organic blue-based pigment which still remains on the black composite iron oxide particles after the above desorption test.

The closer to zero the desorption percentage (%), the smaller the amount of organic blue-based pigment desorbed from the black composite iron oxide particles.

(7) The hue of iron oxide particles, organic blue-based pigment and black composite iron oxide particles, were measured by the following method. That is, 0.5 g of sample particles and 1.5 ml of castor oil were intimately kneaded together by a Hoover's muller to form a paste. 4.5 g of clear lacquer was added to the obtained paste and was intimately mixed to form a paint. The paint was applied on a cast-coated paper by using a 150 µm (6-mil) applicator to produce a coating film piece (having a film thickness of about 30 µm). The thus obtained coating film piece was measured by a multi-spectro-colour-meter "MSC-IS-2D" (manufactured by SUGA TESTING MACHINES MANUFACTURING CO., LTD.) to determine L*, a* and b* values thereof, respectively.

Here, the L* value represents a lightness, and the smaller the L* value, the more excellent the blackness.

(8) The light resistances of the iron oxide particles and the black composite iron oxide pigment were measured by the following method.

That is, a primary color enamel prepared by the following method was applied onto a cold-rolled steel plate (0.8 mm×70 mm×150 mm; JIS G-3141) and dried to form a coating film having a thickness of 150 µm, thereby preparing a test specimen. One half of the thus prepared test specimen was covered with a metal foil, and an ultraviolet light was continuously irradiated on the test specimen at an intensity of 100 mW/cm² for 6 hours using "EYE SUPER UV TESTER SUV-W13" (manufactured by Iwasaki Denki Co., Ltd.). Then, the hues (L*, a* and b* values) of the metal foil-covered non-irradiated portion and the UV-irradiated portion of the test specimen were respectively measured. On the basis of the measured values, the light resistance was expressed by the ΔE1* value calculated according to the following formula:

$$\Delta E1^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

The primary color enamel was prepared as follows. 10 g of the above sample particles, 16 g of an amino alkyd resin and 6 g of a thinner were blended together. The resultant mixture was added together with 90 g of 3mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining the primary color enamel.

(9) The heat resistances of the organic blue-based pigment and the black composite iron oxide pigment were respectively expressed by the temperature corresponding to a crossing point of two tangential lines drawn on two curves constituting the first one of two inflection points which form a peak on a DSC chart obtained by subjecting particles to be measured to differential scanning calorimetry (DSC) using a thermal analyzing apparatus SSC-5000 (manufactured by Seiko Denshi Kogyo Co., Ltd.).

(10) The acid resistance of the black composite iron oxide pigment was measured as follows.

10 g of the sample particles were immersed in an aqueous 5% sulfuric acid solution for 10 minutes. The sample particles are taken out of the aqueous sulfuric acid solution, washed with water and then dried. A coating film containing the thus obtained particles was prepared by the same method as described above, and the L*, a* and b* values thereof were measured. The acid resistance of the black composite iron oxide pigment was expressed by the ΔE2* value calculated according to the following formula:

$$\Delta E2^* = [(\Delta L^*)^2 + (\Delta a^*)^2 + (\Delta b^*)^2]^{1/2}$$

wherein ΔL* represents the difference between L* values of the sample particles before and after the acid immersion treatment; Δa* represents the difference between a* values of the sample particles before and after the acid immersion treatment; and Δb* represents the difference between b* values of the sample particles before and after the acid immersion treatment.

The smaller the ΔE2* value, the more excellent the acid resistance.

(11) The hues of the solvent-based paint and water-based paint containing the black composite iron oxide pigment were measured by the following method.

That is, the respective paints prepared by the below-mentioned methods, were applied onto a cold-rolled steel plate (0.8 mm×70 mm×150 mm; JIS G-3141) and dried to form a coating film having a thickness of 150 μm. The thus obtained test specimens were measured by a multi-spectro-colour-meter "MSC-IS-2D" (manufactured by Suga Testing Machines Manufacturing Co., Ltd.) to determine L*, a* and b* values thereof.

(12) The dispersibility in paint vehicles was evaluated by measuring the gloss of a coating film prepared by the same method as described in the below-mentioned Examples.

(13) The gloss was expressed by a 20° gloss measured using a gloss meter UGV-5D (manufactured by Suga Testing Machines Manufacturing Co., Ltd.). The higher the gloss, the more excellent the dispersibility of the particles.

(14) The viscosity at 25° C. of the paint prepared by the below-mentioned method was measured at a shear rate (D) of 1.92 sec$^{-1}$ using an E-type viscometer (cone plate-type viscometer) "EMD-R" (manufactured by Tokyo Keiki Co., Ltd.).

(15) The heat resistance of a coating film prepared using the black composite iron oxide pigment was measured by the following method.

That is, the test specimen used above was placed in an electric furnace, and heat-treated therein at the respective temperatures for 15 minutes to measure the hues (L*, a* and b* values) of the coating film before and after the heat-treatment at each temperature using a multi-spectro-colour-meter "MSC-IS-2D" (manufactured by Suga Testing Machines Manufacturing Co., Ltd.). On the basis of the measured values, the ΔE4* value was calculated according to the following formula:

$$\Delta E4^* = [(\Delta L^*)^2 + (\Delta a^*)^2 + (\Delta b^*)^2]^{1/2}$$

wherein ΔL* represents the difference between L* values of the coating film before and after the heat-treatment; Δa* represents the difference between a* values of the coating film before and after the heat-treatment; and Δb* represents the difference between b* values of the coating film before and after the heat-treatment.

Then, using a semilog graph paper, the temperatures were plotted on the abscissa thereof, and ΔE4* values were plotted on the ordinate thereof. The heat-resisting temperature of the coating film was expressed by the temperature at which the ΔE4* value was 1.5.

(16) The light resistance of the coating film prepared using the black composite iron oxide pigment was measured by the following method.

That is, one half of the test specimen prepared above for measuring the hue of the paint, was covered with a metal foil, and an ultraviolet light was continuously irradiated over the test specimen at an intensity of 100 mW/cm$^2$ for 6 hours using "EYE SUPER UV TESTER SUV-W13" (manufactured by Iwasaki Denki Co., Ltd.). Then, the hues (L*, a* and b* values) of the metal foil-covered non-irradiated portion and the UV-irradiated portion of the test specimen were respectively measured. The ΔE3* value was calculated from differences between the respective measured values of the metal foil-covered non-irradiated portion and the UV-irradiated portion according to the formula used in the above (8). The light resistance of the resin composition was expressed by the ΔE3* value.

(17) The acid resistance of the coating film was measured by the following method.

That is, the respective paints prepared by the below-mentioned methods, were applied onto a cold-rolled steel plate (0.8 mm×70 mm×150 mm; JIS G-3141) and dried to form a coating film having a thickness of 150 μm. The thus prepared test specimen having the coating film thereon was measured to determine the gloss of the coating film. Then, the test specimen was suspended with a string and immersed in a 5% sulfuric acid aqueous solution filled in a 1,000-ml beaker up to a depth of about 120 mm, and then allowed to stand under the immersed condition at 25° C. for 24 hours.

Then, the test specimen was taken out from the sulfuric acid aqueous solution and slowly washed with falling water. After swishing water off, the test specimen was measured to determine the gloss of a center portion thereof. On the basis of the measured gloss values, the gloss change between before and after the immersion in sulfuric acid aqueous solution (ΔG value) was calculated to evaluate the degree of the acid resistance. The smaller the ΔG value, the more excellent the acid resistance.

(18) The hue of the resin composition tinted with the black composite iron oxide pigment was measured by the following method. That is, a colored resin plate prepared by the below-mentioned method was measured by a multi-spectro-colour-meter "MSC-IS-2D" (manufactured by Suga Testing Machines Manufacturing Co., Ltd.) to determine L*, a* and b* values thereof.

(19) The light resistance of the resin composition tinted with the black composite iron oxide pigment was measured by the following method.

That is, one half of the colored resin plate prepared above for measuring the hue of the resin composition, was covered with a metal foil, and an ultraviolet light was continuously irradiated over the colored resin plate at an intensity of 100 mW/cm$^2$ for 2 hours using "EYE SUPER UV TESTER SUV-W13" (manufactured by Iwasaki Denki Co., Ltd.). Then, the hues (L*, a* and b* values) of the metal foil-covered non-irradiated portion and the UV-irradiated portion of the colored resin plate were respectively measured. The ΔE5* value was calculated from differences between the respective measured values of the metal foil-covered non-irradiated portion and the UV-irradiated portion according to the formula used in the above (8). The light resistance of the resin composition was expressed by the ΔE5* value.

(20) The heat resistance of the resin composition tinted with the black composite iron oxide pigment was measured by the following method.

That is, a colored resin plate prepared by the below-mentioned method was cut into 5 cm square. The cut colored resin plate was pressed by a hot press while varying the hot-pressing temperature and applying a load of 98 MPa (1 ton/cm$^2$) thereto, thereby heat-treating the resin plate at the respective temperatures for 10 minutes. On the basis of the hues (L*, a* and b* values) of the resin plate measured before and after the heat-treatment at each temperature, the ΔE6* value was calculated according to the following formula:

$$\Delta E6^* = [(\Delta L^*)^2 + (\Delta a^*)^2 + (\Delta b^*)^2]^{1/2}$$

wherein ΔL* represents the difference between L* values of the resin plate before and after the heat-treatment; Δa* represents the difference between a* values of the resin plate before and after the heat-treatment; and Δb* represents the difference between b* values of the resin plate before and after the heat-treatment.

Then, using a semilog graph paper, the heat-treating temperatures were plotted on the abscissa thereof, and ΔE6* values were plotted on the ordinate thereof. The heat-resisting temperature of the resin plate was expressed by the temperature at which the ΔE6* value was 1.5.

(21) The dispersibility of the resin composition was evaluated by visually counting the number of undispersed aggregate particles on the surface of the obtained resin composition, and classifying the results into the following five ranks. The rank 5 represents the most excellent dispersing condition.

Rank 1: Not less than 50 undispersed aggregate particles per 1 cm$^2$ were recognized.
Rank 2: 10 to 49 undispersed aggregate particles per 1 cm$^2$ were recognized;
Rank 3: 5 to 9 undispersed aggregate particles per 1 cm$^2$ were recognized;
Rank 4: 1 to 4 undispersed aggregate particles per 1 cm$^2$ were recognized;
Rank 5: No undispersed aggregate particles were recognized.

Example 1

<Production of Black Composite Iron Oxide Particles>

20 kg of Mn-containing hematite particles produced by a method described in Japanese Patent application Laid-open (KOKAI) No. 4-144924 (particle shape: granular; average particle size: 0.32 μm; geometrical standard deviation of particle size: 1.45; BET specific surface area value: 3.3 m$^2$/g; Mn content: 13.0% by weight (calculated as Mn) based on the weight of the particle; L* value: 22.4; a* value: 3.2; b* value: 1.2 and light resistance: ΔE1* value; 7.5° C.), were diaggregated in 150 liters of pure water using a stirrer, and further passed through a TK pipeline homomixer (manufactured by TOKUSHU KIKA KOGYO CO., LTD.) three times, to obtain a slurry containing the Mn-containing hematite particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the Mn-containing hematite particles were dispersed.

The Mn-containing hematite particles in the obtained slurry, which remain on a sieve of 325 meshes (mesh size: 44 μm) was 0%. The slurry was filtered and washed with water, thereby obtaining a wet cake composed of the Mn-containing hematite particles. The obtained wet cake composed of the Mn-containing hematite particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 20 minutes, thereby lightly diaggregating the particles.

110 g of methyltriethoxysilane (tradename: "TSL8123", produced by GE TOSHIBA SILICONE CO., LTD.) was mixed and diluted with 200 ml of ethanol to obtain a solution of methyltriethoxysilane. The methyltriethoxysilane solution was added to the thus diaggregated Mn-containing hematite particles while operating the edge runner. The Mn-containing hematite particles were continuously mixed and stirred at a linear load of 441 N/cm (45 Kg/cm) and a stirring speed of 22 rpm for 60 minutes.

Next, 1100 g of an organic blue-based pigment A (kind: phthalocyanine blue; particle shape: granular; average particle size: 0.06 μm; L* value: 17.7; a* value: 9.7; and b* value: −23.4), were added to the above mixture for 10 minutes while operating the edge runner. Further, the obtained mixture was mixed and stirred at a linear load of 588 N/cm (60 Kg/cm) and a stirring speed of 22 rpm for 60 minutes to form a coating layer composed of the organic blue-based pigment A on the methyltriethoxysilane coat, thereby obtaining composite particles. The obtained composite particles were heat-treated at 105° C. for 60 minutes by using a drier, thereby obtaining black composite iron oxide particles.

The obtained black composite iron oxide particles had an average particle size of 0.32 μm as shown in the electron photograph. In addition, the black composite iron oxide particles showed a geometrical standard deviation of particle sizes of 1.45, a BET specific surface area value of 7.0 m$^2$/g, a L* value of 19.3, a* value of −0.6, b* value of −2.5, heat resistance of 611° C., light resistance (ΔE1*) of 3.2, and acid resistance (ΔE2*) of 1.1. The amount of a coating layer composed of organosilane compounds produced from methyltriethoxysilane was 0.15% by weight (calculated as Si). The amount of the coating layer composed of the organic blue-based pigment A was 6.02% by weight (calculated as C) (corresponding to 10 parts by weight based on 100 parts by weight of the Mn-containing hematite particles). The desorption percentage of the organic blue-based pigment A from the black composite iron oxide particles was 7.5% by weight.

As a result of the observation of electron micrograph, almost no organic blue-based pigment A liberated was recognized, so that it was confirmed that a substantially whole amount of the organic blue-based pigment A added was adhered on the coating layer composed of the organosilane compounds produced from methyltriethoxysilane.

Example 2

<Production of Solvent-based Paint Containing Black Composite Iron Oxide Pigment>

10 g of the black composite iron oxide pigment produced in Example 1 was blended with an amino alkyd resin and a thinner at the following weight ratio, and charged into a 140-ml glass bottle together with 90 g of 3 mmφ glass beads. Next, the obtained mixture was mixed and dispersed for 90 minutes by a paint shaker, thereby preparing a mill base.

Composition of Mill Base

| Black composite iron oxide pigment | 12.2 parts by weight |
|---|---|
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the black composite iron oxide pigment.

Composition of Paint

| Mill base | 39.0 parts by weight |
|---|---|
| Amino alkyd resin (AMILAC No. 1026, produced by KANSAI PAINT CO., LTD.) | 61.0 parts by weight |

The thus obtained solvent-based paint exhibited a viscosity of 714 cP.

It was confirmed that a coating film obtained from the above solvent-based paint had a gloss of 82.9%; a hue represented by an L* value of 19.5, an a* value of −0.7 and a b* value of −2.6; a heat resistance (heat-resisting temperature) of 573° C.: a light resistance (ΔE3* value) of 3.9; and an acid resistance (ΔG value) of 6.7%.

Example 3
<Production of Water-based Paint Containing Black Composite Iron Oxide Pigment>

7.62 g of the black composite iron oxide pigment obtained in Example 1 was blended with a water-soluble alkyd resin and the like at the following weight ratio, and charged into a 140-ml glass bottle together with 90 g of 3 mmφ glass beads. Next, the obtained mixture was mixed and dispersed for 45 minutes and 90 minutes by a paint shaker, thereby preparing a mill base.

Composition of Mill Base

| | |
|---|---|
| Black composite iron oxide pigment | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-soluble paint.

Composition of Paint

| | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 898 cP.

It was confirmed that a coating film obtained from the above water-based paint had a gloss of 78.1%; a hue represented by an $L^*$ value of 19.6, an $a^*$ value of $-0.7$ and a $b^*$ value of $-2.7$; a heat resistance (heat-resisting temperature) of 540° C.; a light resistance ($\Delta E3^*$ value) of 3.9; and an acid resistance ($\Delta G$ value) of 6.4%.

Example 4
<Production of Resin Composition>

2.5 g of the black composite iron oxide pigment obtained in Example 1, and 47.5 g of polyvinyl chloride resin particles 103EP8D (produced by Nippon Zeon Co., Ltd.) were weighed and charged into a 100-ml polybeaker, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for preparing a colored resin plate.

Next, the thus-produced resin composition was interposed between a pair of surface-polished stainless steel plates, placed within a hot press heated to 180° C. and then subjected to a pressure molding while applying a pressure of 98 MPa (1 ton/cm$^2$) thereto, thereby obtaining a colored resin plate having a thickness of 1 mm. The thus-produced colored resin plate had a dispersing condition of rank 5; a hue represented by an $L^*$ value of 20.2, an $a^*$ value of $-0.7$ and a $b^*$ value of $-2.6$; a heat-resisting temperature of 250° C.; and a light resistance ($\Delta E5^*$ value) of 4.0.

Core Particles 1 to 9

Iron oxide particles as core particles 1 to 9 having properties shown in Table 1 were prepared.

Core Particles 10

A slurry containing Mn containing hematite particles was prepared by dispersing 20 kg of the Mn-containing hematite particles obtained by deaggregating the core particles 1, in 150 liters of water. The pH value of the thus obtained re-dispersed slurry containing the Mn-containing hematite particles was adjusted to 10.5 using an aqueous sodium hydroxide solution, and then the slurry concentration was adjusted to 98 g/liter by adding water thereto. After 150 liters of the slurry was heated to 60° C., 2,722 ml of a 1.0 mol/liter NaAlO$_2$ solution (corresponding to 0.5% by weight (calculated as Al) based on the weight of the Mn-containing hematite particles) was added to the slurry. After allowing the obtained slurry to stand for 30 minutes, the pH value of the slurry was adjusted to 7.5 using acetic acid. After further allowing the resultant slurry to stand for 30 minutes, the slurry was subjected to filtration, water-washing, drying and pulverization, thereby obtaining the Mn-containing hematite particles whose surface was coated with hydroxides of aluminum.

The essential production conditions are shown in Table 2, and various properties of the obtained surface-treated Mn-containing hematite particles are shown in Table 3.

Core Particles 11 to 15

The same procedure as defined for the production of the above core particles 10, was conducted except that kinds of core particles and kinds and amounts of surface-coating materials were changed variously, thereby obtaining iron oxide particles coated with the respective coating materials.

The essential production conditions are shown in Table 2, and various properties of the obtained surface-treated iron oxide particles are shown in Table 3.

Meanwhile, in Tables, "A" and "S" as described in the kind of coating material used in surface-treating step, represent hydroxides of aluminum and oxides of silicon, respectively.

Organic Blue-based Pigments A to C

As organic blue-based pigments, phthalocyanine blue pigments having properties as shown in Table 4 were prepared.

Examples 5 to 19 and Comparative Examples 1 to 5

The same procedure as defined in Example 1 was conducted except that kinds and amounts of additives added in coating step with alkoxysilanes or polysiloxanes, linear load and treating time for edge runner treatment used in the coating step with alkoxysilanes or polysiloxanes, kinds and amounts of organic blue-based pigments used in organic blue-based pigment-adhering step, and linear load and treating time for edge runner treatment used in the organic blue-based pigment-adhering step, were changed variously, thereby obtaining black composite iron oxide pigments.

The essential production conditions are shown in Table 5, and various properties of the obtained black composite iron oxide pigments are shown in Table 6.

Examples 20 to 34 and Comparative Examples 6 to 19

The same procedure as defined in Example 2 was conducted except that kinds of black composite iron oxide pigments were changed variously, thereby obtaining paints.

Various properties of the obtained paints and various properties of coating films produced therefrom are shown in Tables 7 to 8.

Examples 35 to 49 and Comparative Examples 20 to 33

The same procedure as defined in Example 3 was conducted except that kinds of black composite iron oxide pigments were changed variously, thereby obtaining water-based paints.

Various properties of the obtained water-based paints and various properties of coating films produced therefrom are shown in Tables 9 to 10.

Examples 50 to 64 and Comparative Examples 34 to 47

The same procedure as defined in Example 4 was conducted except that kinds of black composite iron oxide pigments were changed variously, thereby obtaining resin compositions.

The essential production conditions and various properties of the obtained resin compositions are shown in Tables 11 and 12.

TABLE 1

| Kind of core particles | Properties of iron oxide particles | | |
|---|---|---|---|
| | Kind | Shape | Average particle size (μm) |
| Core particles 1 | Mn-containing hematite particles (Mn content: 13.1 wt. %) | Granular | 0.32 |
| Core particles 2 | Magnetite particles | Octahedral | 0.28 |
| Core particles 3 | Magnetite particles | Spherical | 0.23 |
| Core particles 4 | Magnetite particles | Acicular | 0.40 |
| Core particles 5 | Magnetite particles | Spherical | 0.24 |
| Core particles 6 | Black hematite particles (Mn content: 12.0 wt. %) | Granular | 0.32 |
| Core particles 7 | Black hematite particles | Granular | 0.11 |
| Core particles 8 | Zn ferrite-coated magnetite particles (Zn content: 2.34 wt. %) | Spherical | 0.22 |
| Core particles 9 | Zn-doped magnetite particles (Zn content: 1.68 wt. %) | Spherical | 0.25 |

| Kind of core paticles | Properties of iron oxide particles | | | |
|---|---|---|---|---|
| | Aspect ratio (−) | Geometrical standard deviation value (−) | BET specific surface area value (m²/g) | Amount of carbon black adhered (calculated as C) (wt. %) |
| Core particles 1 | — | 1.49 | 3.1 | — |
| Core particles 2 | — | 1.53 | 4.6 | — |
| Core particles 3 | — | 1.35 | 11.8 | — |
| Core particles 4 | 7.8:1 | 1.53 | 18.8 | — |
| Core particles 5 | — | 1.34 | 13.6 | 10.73 |
| Core particles 6 | — | 1.46 | 5.1 | 8.30 |
| Core particles 7 | — | 1.36 | 17.6 | 4.76 |
| Core particles 8 | — | 1.38 | 7.6 | — |
| Core particles 9 | — | 1.41 | 8.3 | — |

| Kind of core particles | Properties of iron oxide particles | | | |
|---|---|---|---|---|
| | Hue | | | Light resistance (ΔE1* value) (−) |
| | L* value (−) | a* value (−) | b* value (−) | |
| Core particles 1 | 22.4 | 3.2 | 0.8 | 8.1 |
| Core particles 2 | 20.3 | 1.5 | −1.8 | 8.8 |
| Core particles 3 | 20.1 | 1.3 | −2.1 | 7.8 |
| Core particles 4 | 23.8 | 1.7 | −0.8 | 9.6 |
| Core particles 5 | 16.4 | 0.2 | −3.2 | 7.1 |
| Core particles 6 | 16.3 | 0.3 | −1.2 | 7.7 |
| Core particles 7 | 19.8 | 0.6 | −0.2 | 6.9 |
| Core particles 8 | 21.3 | 1.1 | 0.7 | 8.1 |
| Core particles 9 | 21.6 | 0.9 | 0.5 | 9.2 |

TABLE 2

| Core particles | Surface-treating step Additives | | | |
|---|---|---|---|---|
| | Kind of core particles | Kind | Calculated as | Amount (wt. %) |
| Core particles 10 | Core particles 1 | Sodium aluminate | Al | 0.5 |
| Core particles 11 | Core particles 2 | Water glass #3 | SiO₂ | 0.2 |
| Core particles 12 | Core particles 3 | Aluminum sulfate | Al | 1.5 |
| | | Water glass #3 | SiO₂ | 0.5 |
| Core particles 13 | Core particles 4 | Aluminum acetate | Al | 5.0 |
| Core particles 14 | Core particles 8 | Aluminum sulfate | Al | 2.0 |
| Core particles 15 | Core particles 9 | Aluminum acetate | Al | 1.0 |

| Core particles | Surface-treating step Coating material | | |
|---|---|---|---|
| | Kind | Calculated as | Amount (wt. %) |
| Core particles 10 | A | Al | 0.49 |
| Core particles 11 | S | SiO₂ | 0.18 |
| Core particles 12 | A | Al | 1.46 |
| | S | SiO₂ | 0.49 |
| Core particles 13 | A | Al | 4.75 |
| Core particles 14 | A | Al | 1.96 |
| Core particles 15 | A | Al | 0.98 |

TABLE 3

Properties of surface-treated iron oxide particles

| Kind of core particles | Average particle size (μm) | Aspect ratio (-) | Geometrical standard deviation value (-) | BET specific surface area value (m²/g) |
|---|---|---|---|---|
| Core particles 10 | 0.32 | — | 1.47 | 3.8 |
| Core particles 11 | 0.29 | — | 1.51 | 9.8 |
| Core particles 12 | 0.24 | — | 1.35 | 13.3 |
| Core particles 13 | 0.40 | 7.8:1 | 1.52 | 25.4 |
| Core particles 14 | 0.22 | — | 1.38 | 9.3 |
| Core particles 15 | 0.25 | — | 1.40 | 8.4 |

Properties of surface-treated iron oxide particles

| Kind of core particles | Hue L* value (-) | Hue a* value (-) | Hue b* value (-) | Light resistance (ΔE1* value) (-) |
|---|---|---|---|---|
| Core particles 10 | 22.6 | 3.1 | 0.9 | 6.8 |
| Core particles 11 | 21.4 | 1.5 | -1.9 | 7.1 |
| Core particles 12 | 20.7 | 1.2 | -2.0 | 6.7 |
| Core particles 13 | 24.6 | 1.6 | -0.7 | 8.0 |
| Core particles 14 | 21.5 | 1.1 | 0.6 | 7.0 |
| Core particles 15 | 21.9 | 0.9 | 0.4 | 8.5 |

TABLE 4

| Organic blue-based pigment | Properties of organic blue-based pigment Kind | Shape | Average particle size (μm) |
|---|---|---|---|
| Organic blue-based pigment A | Phthalocyanine blue (C.I. Pigment Blue 15:1) | Granular | 0.06 |
| Organic blue-based pigment B | Phthalocyanine blue (C.I. Pigment Blue 15:4) | Granular | 0.08 |
| Organic blue-based pigment C | Phthalocyanine blue (C.I. Pigment Blue 15:2) | Granular | 0.10 |

| Organic blue-based pigment | Hue L* value (-) | Hue a* value (-) | Hue b* value (-) | Heat resistance (° C.) |
|---|---|---|---|---|
| Organic blue-based pigment A | 17.7 | 9.7 | -23.4 | 256 |
| Organic blue-based pigment B | 17.3 | 11.6 | -26.5 | 273 |
| Organic blue-based pigment C | 16.9 | 12.1 | -28.8 | 266 |

TABLE 5

| Examples and Comparative Examples | Kind of core particles |
|---|---|
| Example 5 | Core particles 1 |
| Example 6 | Core particles 2 |
| Example 7 | Core particles 3 |
| Example 8 | Core particles 4 |
| Example 9 | Core particles 5 |
| Example 10 | Core particles 6 |
| Example 11 | Core particles 7 |
| Example 12 | Core particles 8 |
| Example 13 | Core particles 9 |
| Example 14 | Core particles 10 |
| Example 15 | Core particles 11 |
| Example 16 | Core particles 12 |
| Example 17 | Core particles 13 |
| Example 18 | Core particles 14 |
| Example 19 | Core particles 15 |
| Comparative Example 1 | Core particles 3 |
| Comparative Example 2 | Core particles 3 |
| Comparative Example 3 | Core particles 3 |
| Comparative Example 4 | Core particles 3 |
| Comparative Example 5 | Core particles 3 |

Production of black composite iron oxide pigment
Coating step with alkoxysilanes or polysiloxanes
Additives

| Examples and Comparative Examples | Kind | Amount added (wt. part) |
|---|---|---|
| Example 5 | Methyl triethoxysilane | 1.0 |
| Example 6 | Methyl trimethoxysilane | 0.5 |
| Example 7 | Phenyl triethoxysilane | 1.0 |
| Example 8 | Methyl triethoxysilane | 2.0 |
| Example 9 | Dimethyl polysiloxane | 2.0 |
| Example 10 | Dimethyl polysiloxane | 1.5 |
| Example 11 | Dimethyl polysiloxane | 1.0 |
| Example 12 | Dimethyl dimethoxysilane | 2.0 |
| Example 13 | Isobutyl trimethoxysilane | 1.0 |
| Example 14 | Methyl hydrogen polysiloxane | 1.0 |
| Example 15 | BYK-080 | 1.0 |
| Example 16 | TSF4770 | 1.5 |
| Example 17 | Methyl triethoxysilane | 1.5 |
| Example 18 | Methyl triethoxysilane | 1.0 |
| Example 19 | Methyl trimethoxysilane | 2.0 |
| Comparative Example 1 | — | — |
| Comparative Example 2 | Methyl triethoxysilane | 1.0 |
| Comparative Example 3 | Methyl triethoxysilane | 1.0 |
| Comparative Example 4 | Methyl triethoxysilane | 0.005 |
| Comparative Example 5 | γ-aminopropyl triethoxysilane | 1.0 |

Production of black composite iron oxide pigment
Coating step with alkoxysilanes or polysiloxanes

| Examples and Comparative Examples | Edge runner treatment Linear load (N/cm) | Edge runner treatment Linear load (Kg/cm) | Time (min.) | Coating amount (calculated as Si) (wt. %) |
|---|---|---|---|---|
| Example 5 | 588 | 60 | 30 | 0.15 |
| Example 6 | 294 | 30 | 30 | 0.10 |
| Example 7 | 441 | 45 | 20 | 0.13 |
| Example 8 | 294 | 30 | 30 | 0.30 |
| Example 9 | 588 | 60 | 20 | 0.70 |
| Example 10 | 735 | 75 | 20 | 0.50 |
| Example 11 | 588 | 60 | 30 | 0.33 |
| Example 12 | 441 | 45 | 30 | 0.45 |

TABLE 5-continued

| | | | | |
|---|---|---|---|---|
| Example 13 | 588 | 60 | 20 | 0.15 |
| Example 14 | 441 | 45 | 30 | 0.42 |
| Example 15 | 735 | 75 | 20 | 0.17 |
| Example 16 | 294 | 30 | 30 | 0.34 |
| Example 17 | 441 | 45 | 30 | 0.23 |
| Example 18 | 588 | 60 | 20 | 0.15 |
| Example 19 | 588 | 60 | 30 | 0.40 |
| Comparative Example 1 | — | — | — | — |
| Comparative Example 2 | 588 | 60 | 20 | 0.15 |
| Comparative Example 3 | 588 | 60 | 20 | 0.15 |
| Comparative Example 4 | 588 | 60 | 20 | 7 × 10⁻⁴ |
| Comparative Example 5 | 588 | 60 | 20 | 0.13 |

| | Production of black composite iron oxide pigment Adhesion step with organic blue-based pigment | |
|---|---|---|
| | Organic blue-based pigment | |
| Examples and Comparative Examples | Kind | Amount added (wt. %) |
| Example 5 | A | 10.0 |
| Example 6 | B | 5.0 |
| Example 7 | C | 15.0 |
| Example 8 | C | 20.0 |
| Example 9 | A | 3.0 |
| Example 10 | B | 10.0 |
| Example 11 | C | 20.0 |
| Example 12 | A | 10.0 |
| Example 13 | B | 20.0 |
| Example 14 | C | 10.0 |
| Example 15 | A | 7.5 |
| Example 16 | B | 10.0 |
| Example 17 | A | 5.0 |
| Example 18 | C | 15.0 |
| Example 19 | A | 10.0 |
| Comparative Example 1 | A | 10.0 |
| Comparative Example 2 | — | — |
| Comparative Example 3 | A | 200.0 |
| Comparative Example 4 | A | 10.0 |
| Comparative Example 5 | A | 10.0 |

| | Production of black composite iron oxide pigment Adhesion step with organic blue-based pigment | | |
|---|---|---|---|
| | Edge runner treatment | | Amount adhered |
| Examples and Comparative Examples | Linear load (N/cm) | Time (min.) | (calculated as C) (wt. %) |
| | (Kg/cm) | | |
| Example 5 | 588 60 | 20 | 6.02 |
| Example 6 | 441 45 | 30 | 3.11 |
| Example 7 | 294 30 | 30 | 8.65 |
| Example 8 | 294 30 | 30 | 11.07 |
| Example 9 | 735 75 | 20 | 1.89 |
| Example 10 | 588 60 | 20 | 5.98 |
| Example 11 | 588 60 | 20 | 11.05 |
| Example 12 | 441 45 | 30 | 6.03 |
| Example 13 | 588 60 | 20 | 11.08 |
| Example 14 | 735 75 | 20 | 6.00 |
| Example 15 | 588 60 | 20 | 4.60 |
| Example 16 | 441 45 | 30 | 6.02 |
| Example 17 | 294 30 | 30 | 3.13 |
| Example 18 | 588 60 | 20 | 8.64 |
| Example 19 | 441 45 | 30 | 6.01 |
| Comparative Example 1 | 588 60 | 20 | 6.02 |
| Comparative Example 2 | — — | — | — |
| Comparative Example 3 | 588 60 | 20 | 33.27 |
| Comparative Example 4 | 588 60 | 20 | 6.00 |
| Comparative Example 5 | 588 60 | 20 | 5.99 |

TABLE 6

| | Properties of black composite iron oxide pigment | | | |
|---|---|---|---|---|
| Examples and Comparative Examples | Average particle size (μm) | Aspect ratio (–) | Geometrical standard deviation value (–) | BET specific surface area value (m²/g) |
| Example 5 | 0.32 | — | 1.49 | 7.8 |
| Example 6 | 0.28 | — | 1.53 | 9.6 |
| Example 7 | 0.23 | — | 1.36 | 14.3 |
| Example 8 | 0.41 | 7.7:1 | 1.53 | 22.2 |
| Example 9 | 0.24 | — | 1.34 | 14.1 |
| Example 10 | 0.32 | — | 1.47 | 7.4 |
| Example 11 | 0.12 | — | 1.37 | 21.9 |
| Example 12 | 0.22 | — | 1.38 | 11.2 |
| Example 13 | 0.26 | — | 1.41 | 13.8 |
| Example 14 | 0.32 | — | 1.47 | 9.6 |
| Example 15 | 0.29 | — | 1.51 | 12.4 |
| Example 16 | 0.24 | — | 1.35 | 15.6 |
| Example 17 | 0.40 | 7.6:1 | 1.52 | 27.3 |
| Example 18 | 0.22 | — | 1.38 | 12.8 |
| Example 19 | 0.25 | — | 1.40 | 13.6 |
| Comparative Example 1 | 0.23 | — | — | 48.3 |
| Comparative Example 2 | 0.23 | — | 1.36 | 10.3 |
| Comparative Example 3 | 0.24 | — | — | 106.5 |
| Comparative Example 4 | 0.23 | — | — | 38.2 |
| Comparative Example 5 | 0.23 | — | — | 36.6 |

| | Properties of black composite iron oxide pigment Hue | | |
|---|---|---|---|
| Examples and Comparative Examples | L* value (–) | a* value (–) | b* value (–) |
| Example 5 | 20.0 | −0.2 | −0.7 |
| Example 6 | 19.2 | −0.4 | −2.1 |
| Example 7 | 18.7 | −0.5 | −4.2 |
| Example 8 | 19.8 | −0.6 | −3.8 |
| Example 9 | 16.2 | −0.2 | −3.6 |
| Example 10 | 16.0 | −0.3 | −3.4 |
| Example 11 | 18.6 | −0.4 | −3.6 |
| Example 12 | 19.3 | −0.4 | −1.0 |
| Example 13 | 19.0 | −0.5 | −1.5 |
| Example 14 | 19.9 | −0.3 | −0.7 |
| Example 15 | 19.1 | −0.5 | −2.2 |
| Example 16 | 18.6 | −0.5 | −4.0 |
| Example 17 | 20.4 | −0.3 | −2.0 |
| Example 18 | 18.9 | −0.6 | −1.4 |
| Example 19 | 19.4 | −0.5 | −1.2 |
| Comparative Example 1 | 20.0 | 1.2 | −2.2 |
| Comparative Example 2 | 20.3 | 1.4 | −2.0 |
| Comparative Example 3 | 18.0 | 0.6 | −6.8 |
| Comparative Example 4 | 19.8 | 1.1 | −2.3 |
| Comparative Example 5 | 19.8 | 1.0 | −2.3 |

| | Properties of black composite iron oxide pigment | |
|---|---|---|
| Examples and Comparative Examples | Heat resistance (° C.) | Light resistance (ΔE1* value) (–) |
| Example 5 | 633 | 3.0 |
| Example 6 | 321 | 3.8 |

TABLE 6-continued

| | | |
|---|---|---|
| Example 7 | 336 | 3.5 |
| Example 8 | 314 | 3.3 |
| Example 9 | 364 | 2.9 |
| Example 10 | 659 | 2.6 |
| Example 11 | 671 | 2.5 |
| Example 12 | 356 | 3.3 |
| Example 13 | 363 | 3.7 |
| Example 14 | 656 | 1.7 |
| Example 15 | 336 | 2.4 |
| Example 16 | 345 | 2.1 |
| Example 17 | 331 | 2.2 |
| Example 18 | 360 | 1.9 |
| Example 19 | 371 | 2.1 |
| Comparative Example 1 | 259 | 7.5 |
| Comparative Example 2 | 258 | 7.3 |
| Comparative Example 3 | 264 | 5.2 |
| Comparative Example 4 | 260 | 7.0 |
| Comparative Example 5 | 261 | 6.9 |

| | Properties of black composite iron oxide pigment | |
|---|---|---|
| Examples and Comparative Examples | Acid resistance ($\Delta E2^*$ value) (−) | Desorption percentage of organic blue-based pigment (%) |
| Example 5 | 1.08 | 7.4 |
| Example 6 | 1.26 | 6.5 |
| Example 7 | 1.19 | 8.6 |
| Example 8 | 1.15 | 8.8 |
| Example 9 | 0.98 | 5.8 |
| Example 10 | 0.91 | 7.6 |
| Example 11 | 0.94 | 8.3 |
| Example 12 | 1.11 | 6.9 |
| Example 13 | 1.06 | 7.9 |
| Example 14 | 1.00 | 4.1 |
| Example 15 | 1.19 | 3.9 |
| Example 16 | 1.11 | 3.9 |
| Example 17 | 1.13 | 3.4 |
| Example 18 | 1.04 | 4.3 |
| Example 19 | 1.05 | 3.5 |
| Comparative Example 1 | 2.53 | 66.3 |
| Comparative Example 2 | 2.61 | — |
| Comparative Example 3 | 1.76 | 58.5 |
| Comparative Example 4 | 2.41 | 43.2 |
| Comparative Example 5 | 2.78 | 41.8 |

TABLE 7

| | Production of solvent-based paint Kind of black pigment | Properties of paint Viscosity (cP) |
|---|---|---|
| Examples | | |
| Example 20 | Example 5 | 680 |
| Example 21 | Example 6 | 734 |
| Example 22 | Example 7 | 785 |
| Example 23 | Example 8 | 824 |
| Example 24 | Example 9 | 769 |
| Example 25 | Example 10 | 713 |
| Example 26 | Example 11 | 708 |
| Example 27 | Example 12 | 881 |
| Example 28 | Example 13 | 769 |
| Example 29 | Example 14 | 810 |
| Example 30 | Example 15 | 813 |
| Example 31 | Example 16 | 738 |
| Example 32 | Example 17 | 839 |
| Example 33 | Example 18 | 886 |
| Example 34 | Example 19 | 806 |

TABLE 7-continued

| | Properties of coating film | | | |
|---|---|---|---|---|
| | | Hue | | |
| Examples | Gloss (%) | $L^*$ value (−) | $a^*$ value (−) | $b^*$ value (−) |
| Example 20 | 83.0 | 20.2 | −0.3 | −0.6 |
| Example 21 | 82.5 | 19.3 | −0.6 | −2.3 |
| Example 22 | 84.6 | 18.9 | −0.6 | −4.1 |
| Example 23 | 81.9 | 20.0 | −0.7 | −3.6 |
| Example 24 | 106.1 | 16.5 | −0.3 | −3.5 |
| Example 25 | 105.0 | 16.3 | −0.3 | −3.3 |
| Example 26 | 107.3 | 18.7 | −0.5 | −3.7 |
| Example 27 | 84.0 | 19.4 | −0.6 | −1.1 |
| Example 28 | 83.2 | 19.2 | −0.7 | −1.8 |
| Example 29 | 86.4 | 20.1 | −0.5 | −1.0 |
| Example 30 | 88.0 | 19.3 | −0.6 | −2.0 |
| Example 31 | 88.8 | 18.7 | −0.5 | −4.2 |
| Example 32 | 86.3 | 20.5 | −0.4 | −1.8 |
| Example 33 | 87.1 | 19.0 | −0.7 | −1.5 |
| Example 34 | 86.6 | 19.5 | −0.6 | −1.3 |

| | Properties of coating film | | |
|---|---|---|---|
| Examples | Heat resistance (° C.) | Light resistance ($\Delta E3^*$ value) (−) | Acid resistance ($\Delta G$ value) (%) |
| Example 20 | 581 | 4.0 | 6.9 |
| Example 21 | 368 | 4.5 | 8.2 |
| Example 22 | 366 | 4.4 | 7.0 |
| Example 23 | 352 | 4.2 | 7.6 |
| Example 24 | 379 | 3.9 | 5.8 |
| Example 25 | 585 | 3.3 | 5.2 |
| Example 26 | 590 | 3.3 | 5.7 |
| Example 27 | 383 | 4.3 | 7.2 |
| Example 28 | 389 | 4.4 | 7.1 |
| Example 29 | 584 | 2.1 | 6.6 |
| Example 30 | 366 | 2.8 | 7.5 |
| Example 31 | 380 | 2.4 | 6.4 |
| Example 32 | 361 | 2.5 | 7.2 |
| Example 33 | 379 | 2.3 | 6.7 |
| Example 34 | 384 | 2.5 | 6.5 |

TABLE 8

| Comparative Examples | Production of solvent-based paint Kind of black pigment | Properties of paint Viscosity (cP) |
|---|---|---|
| Comparative Example 6 | Core particles 1 | 538 |
| Comparative Example 7 | Core particles 2 | 640 |
| Comparative Example 8 | Core particles 3 | 793 |
| Comparative Example 9 | Core particles 4 | 972 |
| Comparative Example 10 | Core particles 5 | 640 |
| Comparative Example 11 | Core particles 6 | 640 |
| Comparative Example 12 | Core particles 7 | 592 |
| Comparative Example 13 | Core particles 8 | 768 |
| Comparative Example 14 | Core particles 9 | 813 |
| Comparative Example 15 | Comparative Example 1 | 842 |
| Comparative Example 16 | Comparative Example 2 | 862 |

TABLE 8-continued

| Comparative Example 17 | Comparative Example 3 | 796 |
|---|---|---|
| Comparative Example 18 | Comparative Example 4 | 832 |
| Comparative Example 19 | Comparative Example 5 | 756 |

| | Properties of coating film | | | |
|---|---|---|---|---|
| | | Hue | | |
| Comparative Examples | Gloss (%) | L* value (–) | a* value (–) | b* value (–) |
| Comparative Example 6 | 76.1 | 21.9 | 3.3 | 1.0 |
| Comparative Example 7 | 69.3 | 20.1 | 1.6 | –1.6 |
| Comparative Example 8 | 78.4 | 19.8 | 1.4 | –2.0 |
| Comparative Example 9 | 61.1 | 21.2 | 1.9 | –0.7 |
| Comparative Example 10 | 103.0 | 16.1 | 0.3 | –3.0 |
| Comparative Example 11 | 103.3 | 15.6 | 0.5 | –1.1 |
| Comparative Example 12 | 102.1 | 19.5 | 0.7 | –0.1 |
| Comparative Example 13 | 68.2 | 20.3 | 1.2 | 0.8 |
| Comparative Example 14 | 68.9 | 20.8 | 1.1 | 0.7 |
| Comparative Example 15 | 62.1 | 19.8 | 1.1 | –2.0 |
| Comparative Example 16 | 75.4 | 20.0 | 1.3 | –1.9 |
| Comparative Example 17 | 48.5 | 17.9 | 0.6 | –6.6 |
| Comparative Example 18 | 64.2 | 19.4 | 1.0 | –2.1 |
| Comparative Example 19 | 66.3 | 19.3 | 1.1 | –2.2 |

| | Properties of coating film | | |
|---|---|---|---|
| Comparative Examples | Heat resistance (°C.) | Light resistance (ΔE3* value) (–) | Acid resistance (ΔG value) (%) |
| Comparative Example 6 | 563 | 7.8 | 12.8 |
| Comparative Example 7 | 289 | 8.5 | 12.8 |
| Comparative Example 8 | 264 | 7.6 | 16.1 |
| Comparative Example 9 | 268 | 9.4 | 13.1 |
| Comparative Example 10 | 281 | 7.0 | 6.6 |
| Comparative Example 11 | 578 | 7.4 | 6.7 |
| Comparative Example 12 | 583 | 6.6 | 6.8 |
| Comparative Example 13 | 326 | 7.9 | 13.1 |
| Comparative Example 14 | 348 | 9.0 | 11.6 |
| Comparative Example 15 | 268 | 7.3 | 10.8 |
| Comparative Example 16 | 269 | 7.0 | 11.2 |
| Comparative Example 17 | 284 | 5.1 | 6.7 |
| Comparative Example 18 | 271 | 6.8 | 10.5 |
| Comparative Example 19 | 277 | 6.7 | 11.0 |

TABLE 9

| | Production of water-based paint Kind of black pigment | Properties of paint Viscosity (cP) |
|---|---|---|
| Examples | | |
| Example 35 | Example 5 | 886 |
| Example 36 | Example 6 | 876 |
| Example 37 | Example 7 | 882 |
| Example 38 | Example 8 | 911 |
| Example 39 | Example 9 | 879 |
| Example 40 | Example 10 | 913 |
| Example 41 | Example 11 | 924 |
| Example 42 | Example 12 | 836 |
| Example 43 | Example 13 | 843 |
| Example 44 | Example 14 | 872 |
| Example 45 | Example 15 | 861 |
| Example 46 | Example 16 | 793 |
| Example 47 | Example 17 | 870 |
| Example 48 | Example 18 | 812 |
| Example 49 | Example 19 | 846 |

| | Properties of coating film | | | |
|---|---|---|---|---|
| | | Hue | | |
| Examples | Gloss (%) | L* value (–) | a* value (–) | b* value (–) |
| Example 35 | 78.4 | 20.1 | –0.4 | –0.7 |
| Example 36 | 77.9 | 19.4 | –0.5 | –2.2 |
| Example 37 | 79.8 | 19.0 | –0.6 | –4.0 |
| Example 38 | 77.0 | 20.1 | –0.7 | –3.5 |
| Example 39 | 98.7 | 16.7 | –0.4 | –3.3 |
| Example 40 | 98.2 | 16.3 | –0.3 | –3.2 |
| Example 41 | 99.9 | 18.5 | –0.4 | –3.7 |
| Example 42 | 79.0 | 19.3 | –0.7 | –1.0 |
| Example 43 | 78.3 | 19.0 | –0.6 | –1.7 |
| Example 44 | 81.0 | 20.0 | –0.6 | –0.9 |
| Example 45 | 83.2 | 19.2 | –0.7 | –2.1 |
| Example 46 | 84.1 | 18.6 | –0.6 | –4.1 |
| Example 47 | 80.5 | 20.4 | –0.4 | –1.9 |
| Example 48 | 82.8 | 19.1 | –0.6 | –1.3 |
| Example 49 | 82.9 | 19.6 | –0.6 | –1.4 |

| | Properties of coating film | | |
|---|---|---|---|
| Examples | Heat resistance (°C.) | Light resistance (ΔE3* value) (–) | Acid resistance (ΔG value) (%) |
| Example 35 | 544 | 4.0 | 6.8 |
| Example 36 | 348 | 4.4 | 8.0 |
| Example 37 | 339 | 4.4 | 6.9 |
| Example 38 | 322 | 4.1 | 7.7 |
| Example 39 | 345 | 3.9 | 5.9 |
| Example 40 | 550 | 3.4 | 5.1 |
| Example 41 | 555 | 3.3 | 5.6 |
| Example 42 | 373 | 4.5 | 7.1 |
| Example 43 | 369 | 4.3 | 7.0 |
| Example 44 | 549 | 2.3 | 6.5 |
| Example 45 | 364 | 2.9 | 7.4 |
| Example 46 | 364 | 2.3 | 6.3 |
| Example 47 | 340 | 2.5 | 7.1 |
| Example 48 | 362 | 2.4 | 6.6 |
| Example 49 | 366 | 2.4 | 6.4 |

TABLE 10

| Comparative Examples | Production of water-based paint Kind of black pigment | Properties of paint Viscosity (cP) |
|---|---|---|
| Comparative Example 20 | Core particles 1 | 870 |
| Comparative Example 21 | Core particles 2 | 819 |
| Comparative Example 22 | Core particles 3 | 922 |
| Comparative Example 23 | Core particles 4 | 998 |
| Comparative Example 24 | Core particles 5 | 845 |
| Comparative Example 25 | Core particles 6 | 896 |
| Comparative Example 26 | Core particles 7 | 844 |
| Comparative Example 27 | Core particles 8 | 893 |
| Comparative Example 28 | Core particles 9 | 862 |
| Comparative Example 29 | Comparative Example 1 | 913 |
| Comparative Example 30 | Comparative Example 2 | 926 |
| Comparative Example 31 | Comparative Example 3 | 901 |
| Comparative Example 32 | Comparative Example 4 | 883 |
| Comparative Example 33 | Comparative Example 5 | 876 |

| | Properties of coating film | | | |
|---|---|---|---|---|
| | | Hue | | |
| Comparative Examples | Gloss (%) | L* value (−) | a* value (−) | b* value (−) |
| Comparative Example 20 | 73.2 | 22.4 | 3.4 | 1.1 |
| Comparative Example 21 | 65.4 | 21.0 | 1.8 | −1.4 |
| Comparative Example 22 | 70.1 | 20.6 | 1.5 | −2.0 |
| Comparative Example 23 | 48.4 | 21.8 | 2.0 | −0.6 |
| Comparative Example 24 | 94.6 | 17.8 | 0.5 | −2.8 |
| Comparative Example 25 | 90.9 | 16.7 | 0.6 | −1.0 |
| Comparative Example 26 | 90.5 | 20.4 | 0.9 | −0.2 |
| Comparative Example 27 | 64.5 | 21.0 | 1.4 | 0.9 |
| Comparative Example 28 | 65.0 | 21.7 | 1.3 | 0.8 |
| Comparative Example 29 | 58.4 | 20.8 | 1.3 | −1.8 |
| Comparative Example 30 | 71.2 | 21.8 | 1.4 | −1.7 |
| Comparative Example 31 | 44.3 | 18.9 | 0.5 | −6.5 |
| Comparative Example 32 | 59.8 | 20.1 | 1.1 | −2.0 |
| Comparative Example 33 | 62.2 | 20.0 | 1.3 | −2.1 |

TABLE 10-continued

| | Properties of coating film | | |
|---|---|---|---|
| Comparative Examples | Heat resistance (°C.) | Light resistance (ΔE3* value) (−) | Acid resistance (ΔG value) (%) |
| Comparative Example 20 | 532 | 7.9 | 16.9 |
| Comparative Example 21 | 276 | 8.6 | 16.6 |
| Comparative Example 22 | 260 | 7.9 | 21.5 |
| Comparative Example 23 | 261 | 9.5 | 18.7 |
| Comparative Example 24 | 272 | 7.1 | 7.4 |
| Comparative Example 25 | 540 | 7.4 | 8.9 |
| Comparative Example 26 | 543 | 6.8 | 8.8 |
| Comparative Example 27 | 313 | 8.0 | 16.4 |
| Comparative Example 28 | 340 | 9.1 | 12.8 |
| Comparative Example 29 | 243 | 7.5 | 11.6 |
| Comparative Example 30 | 258 | 7.0 | 13.3 |
| Comparative Example 31 | 272 | 5.2 | 8.1 |
| Comparative Example 32 | 263 | 6.9 | 12.4 |
| Comparative Example 33 | 262 | 6.7 | 13.4 |

TABLE 11

| Examples | Production of resin composition Kind of black pigment | Properties of resin composition Dispersing condition (−) |
|---|---|---|
| Example 50 | Example 5 | 5 |
| Example 51 | Example 6 | 5 |
| Example 52 | Example 7 | 5 |
| Example 53 | Example 8 | 4 |
| Example 54 | Example 9 | 5 |
| Example 55 | Example 10 | 5 |
| Example 56 | Example 11 | 5 |
| Example 57 | Example 12 | 5 |
| Example 58 | Example 13 | 5 |
| Example 59 | Example 14 | 5 |
| Example 60 | Example 15 | 5 |
| Example 61 | Example 16 | 5 |
| Example 62 | Example 17 | 4 |
| Example 63 | Example 18 | 5 |
| Example 64 | Example 19 | 5 |

| | Properties of resin composition | | |
|---|---|---|---|
| | Hue | | |
| Examples | L* value (−) | a* value (−) | b* value (−) |
| Example 50 | 21.0 | −0.5 | −1.0 |
| Example 51 | 20.1 | −0.8 | −2.5 |
| Example 52 | 19.5 | −0.9 | −4.8 |
| Example 53 | 20.8 | −1.0 | −3.9 |
| Example 54 | 16.9 | −0.5 | −4.0 |
| Example 55 | 16.8 | −0.4 | −3.6 |
| Example 56 | 19.7 | −0.7 | −4.0 |
| Example 57 | 20.3 | −0.8 | −1.9 |
| Example 58 | 20.0 | −0.8 | −2.1 |

TABLE 11-continued

| Examples | | | |
|---|---|---|---|
| Example 59 | 21.1 | −0.7 | −1.3 |
| Example 60 | 20.2 | −0.8 | −2.2 |
| Example 61 | 19.4 | −0.7 | −4.3 |
| Example 62 | 21.3 | −0.6 | −1.9 |
| Example 63 | 20.1 | −1.0 | −1.8 |
| Example 64 | 20.5 | −0.9 | −1.5 |

| | Properties of resin composition | |
|---|---|---|
| Examples | Heat resistance (° C.) | Light resistance (ΔE5* value) (−) |
| Example 50 | 253 | 4.1 |
| Example 51 | 243 | 4.5 |
| Example 52 | 241 | 4.5 |
| Example 53 | 238 | 4.3 |
| Example 54 | 245 | 4.0 |
| Example 55 | 255 | 3.3 |
| Example 56 | 257 | 3.4 |
| Example 57 | 249 | 4.2 |
| Example 58 | 248 | 4.4 |
| Example 59 | 254 | 2.3 |
| Example 60 | 244 | 2.7 |
| Example 61 | 249 | 2.6 |
| Example 62 | 240 | 2.7 |
| Example 63 | 246 | 2.4 |
| Example 64 | 248 | 2.5 |

TABLE 12

| Comparative Examples | Production of resin composition Kind of black pigment | Properties of resin composition Dispersing condition (−) |
|---|---|---|
| Comparative Example 34 | Core particles 1 | 3 |
| Comparative Example 35 | Core particles 2 | 3 |
| Comparative Example 36 | Core particles 3 | 3 |
| Comparative Example 37 | Core particles 4 | 3 |
| Comparative Example 38 | Core particles 5 | 4 |
| Comparative Example 39 | Core particles 6 | 5 |
| Comparative Example 40 | Core particles 7 | 4 |
| Comparative Example 41 | Core particles 8 | 3 |
| Comparative Example 42 | Core particles 9 | 3 |
| Comparative Example 43 | Comparative Example 1 | 2 |
| Comparative Example 44 | Comparative Example 2 | 3 |
| Comparative Example 45 | Comparative Example 3 | 1 |
| Comparative Example 46 | Comparative Example 4 | 2 |
| Comparative Example 47 | Comparative Example 5 | 2 |

| | Properties of resin composition | | |
|---|---|---|---|
| | | Hue | |
| Comparative Examples | L* value (−) | a* value (−) | b* value (−) |
| Comparative Example 34 | 24.6 | 3.4 | 1.3 |
| Comparative Example 35 | 22.4 | 1.9 | −1.5 |
| Comparative Example 36 | 22.4 | 1.5 | −1.8 |
| Comparative Example 37 | 24.8 | 2.1 | −0.5 |
| Comparative Example 38 | 18.8 | 0.5 | −2.7 |
| Comparative Example 39 | 17.5 | 0.8 | −1.0 |
| Comparative Example 40 | 21.2 | 0.9 | −0.2 |
| Comparative Example 41 | 21.1 | 1.5 | −1.0 |
| Comparative Example 42 | 22.3 | 1.3 | −0.9 |
| Comparative Example 43 | 21.0 | 1.2 | −1.9 |
| Comparative Example 44 | 21.4 | 1.4 | −1.6 |
| Comparative Example 45 | 18.9 | 0.8 | −6.4 |
| Comparative Example 46 | 20.3 | 1.2 | −1.9 |
| Comparative Example 47 | 20.8 | 1.4 | −2.0 |

| | Properties of resin composition | |
|---|---|---|
| Comparative Examples | Heat resistance (° C.) | Light resistance (ΔE3* value) (−) |
| Comparative Example 34 | 250 | 8.3 |
| Comparative Example 35 | 230 | 8.6 |
| Comparative Example 36 | 221 | 7.8 |
| Comparative Example 37 | 224 | 9.5 |
| Comparative Example 38 | 228 | 7.2 |
| Comparative Example 39 | 291 | 7.5 |
| Comparative Example 40 | 293 | 6.7 |
| Comparative Example 41 | 232 | 7.8 |
| Comparative Example 42 | 234 | 9.2 |
| Comparative Example 43 | 225 | 7.5 |
| Comparative Example 44 | 226 | 7.1 |
| Comparative Example 45 | 229 | 5.2 |
| Comparative Example 46 | 227 | 6.9 |
| Comparative Example 47 | 228 | 6.7 |

What is claimed is:

1. A black composite iron oxide pigment comprising composite iron oxide particles having an average particle size of 0.08 to 1.0 μm, comprising:
 as core particles iron oxide particles,
 a coating formed on surface of said iron oxide particle, comprising at least one organosilicon compound selected from the group consisting of:
  (1) organosilane compounds obtainable from alkoxysilane compounds, and
  (2) polysiloxanes or modified polysiloxanes, and
 an organic blue-based pigment coat formed on said coating comprising said organosilicon compound, in an amount of from 1 to 50 parts by weight based on 100 parts by weight of said iron oxide particles.

2. A black composite iron oxide pigment according to claim 1, wherein a coating layer composed of at least one compound selected from the group consisting of hydroxides of aluminum, oxides of aluminum, hydroxides of silicon and oxides of silicon is disposed between the surface of said iron oxide particles and coating layer comprising said organosilicon compound.

3. A black composite iron oxide pigment according to claim 1, wherein the amount of said coating organosilicon compounds is 0.02 to 5.0% by weight, calculated as Si, based on the total weight of the organosilicon compounds and said iron oxide particles.

4. A black composite iron oxide pigment according to claim 1, which further have a geometrical standard deviation value of the average particle size of not more than 2.0 and a BET specific surface area of 1 to 200 m$^2$/g.

5. A black composite iron oxide pigment according to claim 1, which further has a heat resistance of not less than 280° C., a light resistance ($\Delta E1^*$ value) of not more than 5.0, an acid resistance ($\Delta E2^*$ value) of not more than 1.50, an $L^*$ value of 14.5 to 23.0, an $a^*$ value of −2.2 to 0.0, and a $b^*$ value of −6.5 to 1.5.

6. A paint comprising the black composite iron oxide pigment as defined in claim 1, and a paint base material.

7. A paint according to claim 6 having a gloss of not less than 75.0%, an acid resistance ($\Delta G$ value) of not more than 10.0, a light resistance ($\Delta E3^*$ value) of not more than 5.0, an $L^*$ value of 14.5 to 23.0, an $a^*$ value of −2.0 to 0.0, and a $b^*$ value of −6.5 to 1.5.

8. A resin composition tinted with the black composite iron oxide pigment as defined in claim 1.

9. A resin composition according to claim 8 having a heat resistance of not less than 225° C., a light resistance ($\Delta E5^*$ value) of not more than 5.0, an $L^*$ value of 16.0 to 23.5, an $a^*$ value of −2.0 to 0.0, and a $b^*$ value of −6.5 to 1.5.

10. A black composite iron oxide pigment comprising composite iron oxide particles having an average particle size of 0.08 to 1.0 μm, a geometrical standard deviation value of the average particle size of not more than 2.0, comprising:

as core particles iron oxide particles, a coating formed on surface of said iron oxide particle, comprising at least one organosilicon compound selected from the group consisting of:

(1) organosilane compounds obtainable from alkoxysilane compounds, and (2) polysiloxanes or modified polysiloxanes, and an organic blue-based pigment coat formed on said coating comprising said organosilicon compound, in an amount of from 1 to 50 parts by weight based on 100 parts by weight of said iron oxide particles.

11. A black composite iron oxide pigment comprising composite iron oxide particles having an average particle size of 0.08 to 1.0 μm, comprising:

(A) as core particles composite iron oxide particles precursor, comprising:

iron oxide particles, a coating formed on the surface of said iron oxide particles, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating layer comprising said organosilicon compound, in an amount of 1 to 30 parts by weight based on 100 parts by weight of the said iron oxide particles;

(B) a coating formed on the carbon black coat, comprising at least one organosilicon compound selected from the group consisting of:

(1) organosilane compounds obtainable from alkoxysilane compounds, and (2) polysiloxanes or modified polysiloxanes; and (C) an organic blue-based pigment coat formed on said coating comprising said organosilicon compound, in an amount of from 1 to 50 parts by weight based on 100 parts by weight of said iron oxide particles.

12. A black composite iron oxide pigment according to claim 11 wherein a coating layer composed of at least one compound selected from the group consisting of hydroxides of aluminum, oxides of aluminum, hydroxides of silicon and oxides of silicon is disposed between the surface of said iron oxide particles and coating layer comprising said organosilicon compound.

* * * * *